(12) United States Patent
Kimoto et al.

(10) Patent No.: US 9,976,520 B2
(45) Date of Patent: May 22, 2018

(54) VAPORIZED FUEL PROCESSING APPARATUS

(71) Applicant: AISAN KOGYO KABUSHIKI KAISHA, Obu-shi, Aichi-ken (JP)

(72) Inventors: Junya Kimoto, Obu (JP); Yoshikazu Miyabe, Obu (JP)

(73) Assignee: AISAN KOGYO KABUSHIKI KAISHA, Obu-Shi, Aichi-Ken (JP)

(*) Notice: Subject to any disclaimer, the term of this patent is extended or adjusted under 35 U.S.C. 154(b) by 0 days. days.

(21) Appl. No.: 15/507,936

(22) PCT Filed: Aug. 27, 2015

(86) PCT No.: PCT/JP2015/074146
§ 371 (c)(1),
(2) Date: Mar. 1, 2017

(87) PCT Pub. No.: WO2016/035655
PCT Pub. Date: Mar. 10, 2016

(65) Prior Publication Data
US 2017/0292477 A1    Oct. 12, 2017

(30) Foreign Application Priority Data

Sep. 1, 2014  (JP) ................................ 2014-176952
Sep. 1, 2014  (JP) ................................ 2014-176953

(51) Int. Cl.
*F02M 25/08*  (2006.01)
*B60K 15/035*  (2006.01)
(Continued)

(52) U.S. Cl.
CPC ..... *F02M 25/089* (2013.01); *B60K 15/03504* (2013.01); *B60K 15/05* (2013.01);
(Continued)

(58) Field of Classification Search
CPC .. F02M 25/08; F02M 25/089; F02M 25/0836; B60K 15/03; B60K 15/03504;
(Continued)

(56) References Cited

U.S. PATENT DOCUMENTS 4,796,593 A * 1/1989 Woodcock ......... F02M 25/0836
                                                    123/516
4,932,444 A * 6/1990 Micek .............. B60K 15/03504
                                                    123/519

(Continued)

FOREIGN PATENT DOCUMENTS

JP    H5-332204 A    12/1993
JP    3348568 B2    11/2002

(Continued)

OTHER PUBLICATIONS

International Patent Application No. PCT/JP2015/074146 International Search Report and Written Opinion dated Nov. 24, 2015 (12 pages).

(Continued)

*Primary Examiner* — Hieu T Vo
(74) *Attorney, Agent, or Firm* — Conley Rose, P.C.

(57) ABSTRACT

A vaporized fuel processing apparatus in which, if an internal pressure of a fuel tank is high when refueling, a closing valve opens before a refueling cap opens, so that vaporized fuel is flown to a canister via a path with a float valve to lower the internal pressure of the tank. The apparatus includes a refueling switch for instructing a start of refueling to the fuel tank, an internal pressure sensor for detecting a space pressure inside the tank, and a closing valve control means for, if the refueling start signal is output from the refueling switch and the internal pressure of the fuel tank is higher than a set pressure, opening the closing valve within a range in which the float valve does not operate, and increasing the valve-opening speed of the closing valve in accordance with a reduction in the internal pressure of the fuel tank.

20 Claims, 17 Drawing Sheets

(51) Int. Cl.
*B60K 15/05* (2006.01)
*B60K 15/03* (2006.01)

(52) U.S. Cl.
CPC ............ *B60K 2015/03289* (2013.01); *B60K 2015/03514* (2013.01)

(58) Field of Classification Search
CPC .. B60K 15/03289; B60K 15/04; B60K 15/05; B60K 2015/03514
See application file for complete search history.

(56) References Cited

U.S. PATENT DOCUMENTS

| | | | |
|---|---|---|---|
| 5,657,734 A | 8/1997 | Sawamoto et al. | |
| 7,568,494 B2 * | 8/2009 | Devall | F16K 24/044 137/202 |
| 8,118,011 B2 | 2/2012 | Hirose | |
| 2011/0203554 A1 | 8/2011 | Horiba et al. | |

FOREIGN PATENT DOCUMENTS

| | | |
|---|---|---|
| JP | 2004-156496 A | 6/2004 |
| JP | 2011-169276 A | 9/2011 |
| JP | 5167023 B2 | 3/2013 |
| JP | 5400669 B2 | 1/2014 |
| JP | 5525295 B2 | 6/2014 |

OTHER PUBLICATIONS

Japanese Office Action dated Nov. 22, 2017, for Japanese Application No. 2016-546594 (3 p.).
English Translation of Japanese Office Action dated Nov. 22, 2017, for Japanese Application No. 2016-546594 (3 p.).

* cited by examiner

VAPORIZED FUEL PROCESSING APPARATUS

CROSS-REFERENCE TO RELATED APPLICATIONS

The present application is a National Phase entry of, and claims priority to, PCT Application No. PCT/JP2015/074146, filed Aug. 27, 2015, which claims priority to Japanese Patent Application Nos. 2014-176952 and 2014-176953, both filed Sep. 1, 2014, all of which are incorporated herein by reference in their entireties.

STATEMENT REGARDING FEDERALLY SPONSORED RESEARCH OR DEVELOPMENT

Not applicable.

BACKGROUND

The present disclosure relates to a vaporized fuel processing apparatus which has, in a path connecting a fuel tank and a canister, a closing valve that controls communication between the fuel tank and the canister.

A known vaporized fuel processing apparatus equipped with a closing valve has a problem in that, if the fuel tank is in a sealed state due to closing of the closing valve, and the internal pressure of the fuel tank is high, vaporized fuel that has accumulated in the fuel tank may be dissipated into the atmosphere via a refueling port when the refueling cap of the fuel tank is opened for refueling. In view of this, according to the invention disclosed in Japanese Laid-Open Patent Publication No. 2011-169276, if the fuel tank internal pressure is high at the time of refueling, the closing valve is opened to reduce the fuel tank internal pressure before opening the refueling cap. Further, if the speed at which the fuel tank internal pressure is reduced is high, a float valve inside the fuel tank may be closed to cause a problem in that a reduction in the internal pressure is not possible; in view of this, a control is performed to suppress the opening degree of the closing valve for suppressing the reduction speed.

BRIEF SUMMARY

The above technique, however, still has a problem in that, because of suppression of the internal pressure reducing speed of the fuel tank, it takes a long time before the internal pressure is reduced to such a degree as to allow refueling if the initial internal pressure is high.

In view of this problem, there has been a need in the art for a vaporized fuel processing apparatus that can shorten the requisite time for reducing the fuel tank internal pressure to a pressure allowing refueling.

According to a first aspect of the present disclosure, there is provided a vaporized fuel processing apparatus in which vaporized fuel in a fuel tank is adsorbed by a canister, the adsorbed vaporized fuel is drawn into an engine, a closing valve controlling communication between the fuel tank and the canister is provided in a path connecting the fuel tank and the canister, and a float valve is provided for preventing fuel from flowing out into the path from the fuel tank, the vaporized fuel processing apparatus comprising a refueling switch operated for instructing a start of refueling to the fuel tank and outputting a refueling start signal, an internal pressure sensor detecting a pressure of a space inside the fuel tank as an internal pressure, and a closing valve control means which, if the refueling start signal is output from the refueling switch and if the internal pressure of the fuel tank detected by the internal pressure sensor is higher than a set pressure that is previously set, causes the closing valve to open within a range, in which the float valve does not operate, and increases the valve-opening speed of the closing valve in accordance with a reduction in the internal pressure of the fuel tank from a valve opening start time.

The closing valve control means may incorporate a control in which the valve-opening speed of the closing valve is increased stepwise or continuously in accordance with the reduction in the internal pressure of the fuel tank detected by the internal pressure sensor.

With the first aspect of the present disclosure, if the internal pressure of the fuel tank is high when the filling start signal is output from the refueling switch, the closing valve is opened before the refueling is started, and the vaporized fuel within the fuel tank is sent to the canister to be adsorbed. Thus, the vaporized fuel within the fuel tank is prevented from being dissipated into the atmosphere via the refueling port. At this time, the closing valve is controlled to be opened within a range in which the float valve is not operated to be closed, and the valve-opening speed is increased in accordance with the reduction in the internal pressure of the fuel tank. Therefore, it is possible for the vaporized fuel in the fuel tank to be quickly adsorbed by the canister, with the float valve not being closed, making it possible to shorten the period between the moment that the refueling start signal is output from the refueling switch and the moment that the refueling becomes possible.

According to a second aspect of the present disclosure, the closing valve control means performs an opening-degree control of the closing valve from the valve opening start time at least in two stages, in which, in comparison with a first stage at the valve opening start time, an opening degree is larger and a valve opening speed is higher at a second stage after the first stage.

In the second aspect of the present disclosure, the switching between the first stage and the second stage can be effected when the internal pressure inside the fuel tank detected by the internal pressure sensor has reached a predetermined switching pressure. Further, the closing valve control means may not perform the opening degree control of the closing valve at the first stage and may perform only the control at the second stage if the internal pressure of the fuel tank detected by the internal pressure sensor at the valve opening start time is lower than the switching pressure.

According to a third aspect of the present disclosure, the closing valve control means controls the opening degree of the closing valve in accordance with the internal pressure of the fuel tank at the first stage, and opens the closing valve stepwise by a predetermined amount at the second stage.

According to a fourth aspect of the present disclosure, the closing valve control means controls the valve-opening speed of the closing valve in accordance with the internal pressure of the fuel tank detected by the internal pressure sensor such that the higher the internal pressure, the lower the valve-opening speed.

According to a fifth aspect of the present disclosure, at the first and second stages, the closing valve control means increases stepwise the opening degree of the closing valve.

According to a sixth aspect of the present disclosure, the closing valve control means controls, in the first stage mentioned above, the valve-opening amount of the closing valve in accordance with the internal pressure of the fuel tank detected by the internal pressure sensor such that the higher the internal pressure, the smaller the valve-opening amount.

According to a seventh aspect of the present disclosure, the closing valve control means performs, in the first stage mentioned above, the opening-degree control of the closing valve such that the reduction gradient of the fuel tank internal pressure detected by the internal pressure sensor is not a predetermined value or more.

According to an eighth aspect of the present disclosure, if the closing operation of the float valve is detected, the closing valve control means reduces the opening degree of the closing valve by a predetermined amount.

In the eighth aspect of the present disclosure, the detection of the closing operation of the float valve may be effected by detecting that the reduction amount of the fuel tank internal pressure is small in the state in which the closing valve is open. Further, the reduction of the opening degree of the closing valve is performed by a control of closing stepwise the closing valve by a predetermined amount, or by a control of continuously decreasing the opening degree of the closing valve until the float valve opens again.

With the eighth aspect of the present disclosure, if the float valve is closed because the flow velocity of the vaporized fuel flowing from the fuel tank to the canister through the closing valve becomes too high, the opening degree of the closing valve is temporarily reduced. As a result, the flow velocity of the vaporized fuel flowing from the fuel tank to the canister through the closing valve is suppressed, making it possible to open the float valve again. Thus, even after the float valve is temporarily closed, it is possible to continue the adsorption of the vaporized fuel from the fuel tank, making it possible to avoid an occasion that the refueling cannot be made.

According to a ninth aspect of the present disclosure, there is provided a lid door opening means that opens a lid door, which closes a refueling port of the fuel tank, if the refueling start signal is output, besides the internal pressure of the fuel tank detected by the internal pressure sensor is lower than the set pressure.

According to a tenth aspect of the present disclosure, there is provided a vaporized fuel processing apparatus in which a breather pipe is provided so as to circulate vaporized fuel generated inside a fuel tank during refueling to a region of a refueling port of the fuel tank, the vaporized fuel in the fuel tank is adsorbed by a canister, the adsorbed vaporized fuel is drawn into an engine, and a closing valve controlling communication between the fuel tank and the canister is provided in a path connecting the fuel tank and the canister, the vaporized fuel processing apparatus comprising a closing valve control means that controls an opening degree of the closing valve to a predetermined opening degree after starting the refueling, the predetermined opening degree being an opening degree which causes an internal pressure of the fuel tank to become higher than a first pressure that is necessary for circulating a requisite amount of vaporized fuel to the region of the refueling port of the fuel tank via the breather pipe.

In the tenth aspect of the present disclosure, the predetermined opening degree to which the closing valve is controlled may be a predetermined fixed opening degree. Further, the predetermined opening degree to which the closing valve is controlled may be that causes to open the fuel tank so as to draw out the vaporized fuel accumulated therein before starting the refueling, and that causes the closing valve to be closed by a predetermined amount in accordance with the reduction in the vaporized fuel generated in the fuel tank as the refueling is completed after starting the refueling.

With the tenth aspect of the present disclosure, the opening degree of the closing valve is controlled by the closing valve control means, so that the fuel tank internal pressure during refueling becomes to be a pressure higher than the first pressure necessary for circulating the requisite amount of vaporized fuel to the region of the refueling port of the fuel tank via the breather pipe. Thus, it is possible to adjust the amount of the vaporized fuel circulated by the breather pipe to a proper amount during the refueling. That is, without need of adjusting the flow resistance of the breather pipe, which is of high difficulty, the fuel tank internal pressure is adjusted by making the closing valve in the path connecting the fuel tank and the canister to function as a pressure adjustment means, so that it possible to perform such an adjustment that the amount of the circulated vaporized fuel does not fluctuate under the influence of an ambient change such as a variation in temperature.

According to an eleventh aspect of the present disclosure, the predetermined opening degree is an opening degree that causes the internal pressure of the fuel tank to become lower than a second pressure, and the second pressure corresponds to a pressure at which an auto stop function is exerted to stop the refueling by a refueling gun when the fuel tank is filled up.

In the eleventh aspect of the present disclosure, the second pressure may be a pressure equal to the pressure causing the auto stop function to be exerted, or a pressure slightly lower than the pressure causing the auto stop function to be exerted.

According to a twelfth aspect of the present disclosure, there is provided an internal pressure sensor for detecting a space pressure within the fuel tank as the internal pressure, and the closing valve control means controls, after starting the refueling, the opening degree of the closing valve based on the internal pressure of the fuel tank detected by the internal pressure sensor.

According to a thirteenth aspect of the present disclosure, the closing valve control means closes the closing valve by a first predetermined amount when the internal pressure of the fuel tank detected by the internal pressure sensor becomes lower than a first set pressure that is previously set.

According to a fourteenth aspect of the present disclosure, the above-mentioned closing valve control means controls the opening degree of the closing valve such that the internal pressure of the fuel tank detected by the internal pressure sensor becomes a second preset pressure.

According to a fifteenth aspect of the present disclosure, the closing valve control means performs the opening-degree control of the closing valve after having detected a peak of the internal pressure, which is increased by the vaporized fuel generated in the fuel tank when the refueling is started.

In the fifteenth aspect of the present disclosure, the detection of the peak may be effected by detecting that the internal pressure has attained a pressure set to be slightly lower than the predetermined peak pressure or by detecting that the internal pressure has been changed from increase to decrease.

According to a sixteenth aspect of the present disclosure, the closing valve control means opens the closing valve to a predetermined opening degree or by a second predetermined amount when the internal pressure of the fuel tank detected by the internal pressure sensor has reached to the second pressure.

With the sixteenth aspect of the present disclosure, the closing valve is opened to the predetermined opening degree or by the second predetermined amount when the fuel tank internal pressure has reached the second pressure. Due to this arrangement, even in case that the fuel tank internal pressure is lowered and the auto stop function of the refueling gun is temporarily exerted before the fuel tank is filled up, it is possible to release the auto stop function immediately to allow the refueling to be continued.

DETAILED DESCRIPTION

Figure 1:
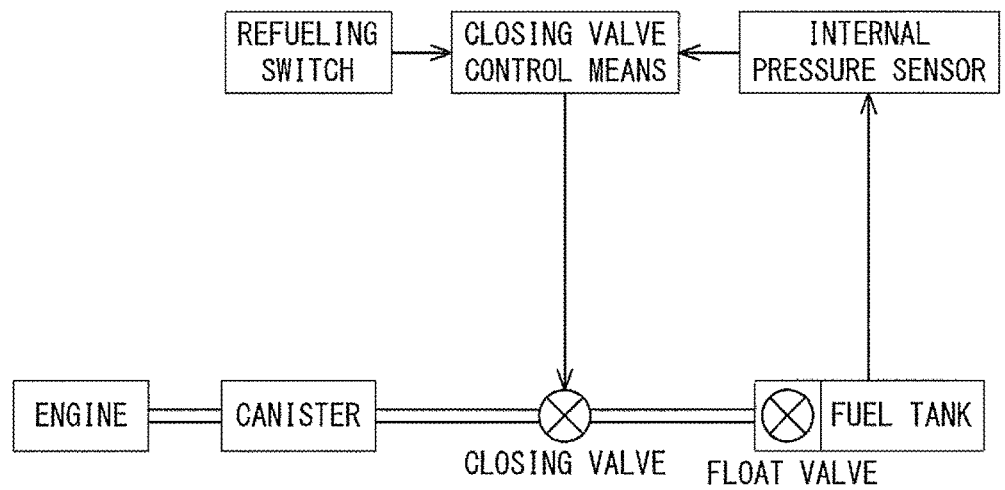
FIG. 1 is a conceptual diagram according to an embodiment.
Figure 2:
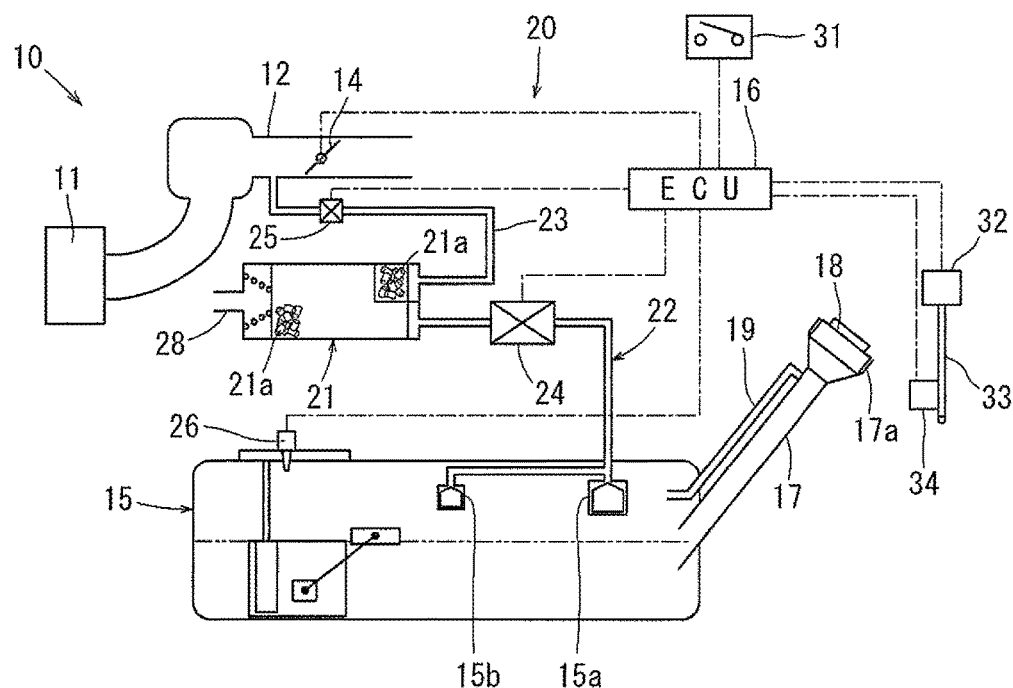
FIG. 2 is a diagram illustrating a system configuration according to a first embodiment of the present disclosure.
Figure 3:
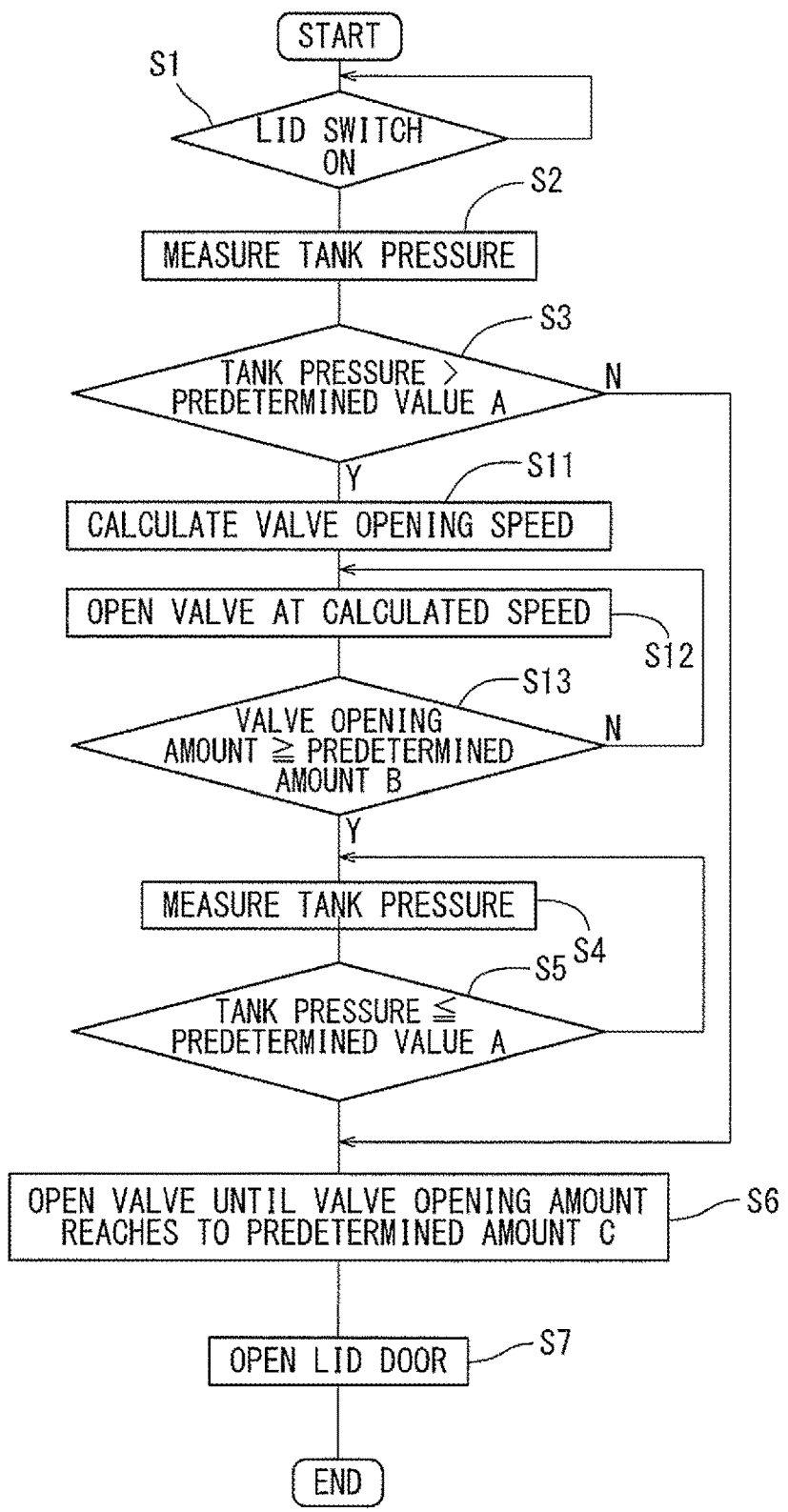
FIG. 3 is a flowchart illustrating a processing routine for a valve-opening control of a closing valve and an opening control of a lid door according to the first embodiment.

FIG. 1 is a conceptual diagram according to an embodiment. FIGS. 2 and 3 illustrate a first embodiment. As shown in FIG. 2, a vaporized fuel processing apparatus 20 is added to an engine system 10 of a vehicle.

In FIG. 2, the engine system 10 supplies a mixture of air and fuel to an engine main body 11 via an intake passage 12. The air is supplied while its flow rate is controlled by a throttle valve 14, and the fuel is supplied while its flow rate is controlled by a fuel injection valve (not shown). The throttle valve 14 and the fuel injection valve are both connected to a control circuit 16; the throttle valve 14 supplies a signal related to the valve-opening amount of the throttle valve 14 to the control circuit 16, and the fuel injection valve is controlled with respect to its valve-opening period by the control circuit 16. Fuel is supplied to the fuel injection valve, and that fuel has been supplied from a fuel tank 15.

The vaporized fuel processing apparatus 20 causes vaporized fuel generated during refueling or fuel vaporized in the fuel tank 15 (hereinafter referred to as vaporized fuel) to be adsorbed by a canister 21 via a vapor passage 22. The vaporized fuel adsorbed by the canister 21 is supplied to the intake passage 12 at a position on the downstream side of the throttle valve 14 via a purge passage 23. In the vapor passage 22, there is provided a step motor type closing valve (hereinafter also simply referred to as the closing valve) 24 for opening and closing this passage 22, and in the purge passage 23, there is provided a purge valve 25 for opening and closing this passage 23. The closing valve 24 has a region in which this valve is held in the closed state until communication is established between the fuel tank 15 and the canister 21 after the valve-opening movement is started by the step motor, and the closing valve 24 is capable of continuously changing the opening degree. Inside the fuel tank 15, the inlet portion of the vapor passage 22 is branched into two inlet portions; a float valve 15a is provided in one of the two inlet portions, and a cut valve 15b is provided in the other of the two inlet portions. When the fuel tank 15 is filled up, the float valve 15a is closed so that no fuel may flow into the vapor passage 22. If the fuel tank 15 is tilted to rise the fuel surface level, the cut valve 15b is closed so that no fuel may flow into the vapor passage 22.

Activated carbon 21a as an adsorbent material is charged into the canister 21; the vaporized fuel from the vapor passage 22 is adsorbed by the activated carbon 21a, and this adsorbed vaporized fuel is discharged into the purge passage 23. An atmosphere passage 28 is also connected to the canister 21; if an intake negative pressure is applied to the canister 21 via the purge passage 23, atmospheric air is supplied via the atmosphere passage 28, so that the vaporized fuel is purged via the purge passage 23. The atmosphere passage 28 draws atmospheric air from a position proximal to a refueling port 17a of a refueling pipe 17 provided on the fuel tank 15.

A breather pipe 19 is arrange parallel to the refueling pipe 17 through which fuel is supplied to the fuel tank 15, and an end portion of the breather pipe 19 on the side of the refueling port 17a is fixed in position so as to open at a position (which corresponds a region of the refueling port) that is opposed to the leading end portion of a refueling gun (not shown) when the refueling gun is inserted into the refueling port 17a. On the other hand, an end portion of the breather pipe 19 on the side of the fuel tank 15 is fixed in position so as to be open in the upper space inside the fuel tank 15. The function of the breather pipe 19 is the same as that of the prior-art, and causes the vaporized fuel generated inside the fuel tank 15 during the filling to be circulated to the region near the refueling port 17a.

A refueling cap 18 is disposed at the refueling port 17a and can be detached to allow refueling if the refueling is to be made. The refueling port 17a is arrange so as to be exposed at the vehicle body surface, and a lid door 33 is provided at that portion, so that the refueling port 17a is covered with the lid door 33. The lid door 33 is provided with a lid opener 32 for opening the lid door 33, which is normally closed. If a lid switch (which corresponds to the refueling switch) 31 is operated by the occupant of the vehicle, a refueling start signal is input to the control circuit 16, and the lid opener 32 receives an operation signal transmitted from the control circuit 16 and opens the lid door 33. Further, the lid door 33 is provided with a lid door sensor 34 for detecting the opening and closing thereof.

Various signals necessary for controlling the valve-opening period of the fuel injection valve, etc. are input to the control circuit 16. In the configuration shown in FIG. 2, in addition to the valve-opening amount signal of the above-mentioned throttle valve 14, input to the control circuit 16 are a detection signal of a pressure sensor (hereinafter referred to as the internal pressure sensor) 26 for detecting the internal pressure of the fuel tank 15, a lid-door-open signal for the lid switch 31, and a detection signal of the lid door sensor 34. Further, in addition to the control of the valve-opening period of the fuel injection valve mentioned above, the control circuit 16 performs, in the configuration shown in FIG. 2, a valve-opening control of each of the closing valve 24 and the purge valve 25, and an opening operation for the lid opener 32.

Next, a process routine for the valve-opening control of the step motor type closing valve 24 and for the opening control of the lid door 33, executed by the control circuit 16, will be described based on the flowchart in FIG. 3 with reference to the timechart of FIG. 4 and the graph in FIG. 5.

As the process of this routine is executed, it is determined, in Step S1, whether or not the lid switch 31 has been turned on to output the lid-door-open signal. Until the lid switch 31 is turned on, the determination in Step S1 is NO; if the lid switch 31 is turned on, the determination in Step S1 is YES, and, in Step S2, the internal pressure of the fuel tank 15 (hereinafter also referred to as the tank pressure) detected by the internal pressure sensor 26 is measured and retrieved. In Step S3, it is determined whether or not the tank pressure is higher than a predetermined value A.

If the tank pressure is higher than the predetermined value A, the determination in Step S3 is YES, and, in Step S11, the valve-opening speed of the closing valve 24 is calculated. This calculation is conducted based on a map previously stored in a memory of the control circuit 16. FIG. 5 shows the contents of the map. As is apparent from FIG. 5, in Step S11, the valve-opening speed is set in accordance with the tank pressure such that the higher the tank pressure, the lower the valve-opening speed. In the next Step S12, the closing valve 24 is opened at the valve-opening speed as calculated in Step S11. At time T1 in FIG. 4, the lid switch 31 is turned on, and, it is shown that the closing valve 24 is opened at the calculated valve-opening speed in the state in which the tank pressure is higher than the predetermined value A. FIG. 4 shows that the tank pressure is reduced as the closing valve 24 is opened.

In Step S13 of FIG. 3, it is determined whether or not the valve-opening amount of the closing valve 24 has reached a predetermined amount B. Until the valve-opening amount reaches the predetermined amount B, the determination in Step S13 is NO, and the valve opening process in Step S12 is continued. If the valve opening amount reaches the predetermined value B, resulting in that the determination in Step S13 is YES, the tank pressure is measured again in Step S4, and, in Step S5, it is determined whether or not the tank pressure has become the predetermined value A or less. Until the tank pressure becomes the predetermined value A or less, the determination in Step S5 is NO; if, however, the tank pressure becomes the predetermined value A or less, the determination in Step S5 is YES, and, in Step S6, the valve-opening amount of the closing valve 24 is increased to a predetermined amount C. Referring to time T2 of FIG. 4, it is shown that at the time when the tank pressure becomes the predetermined value A or less, the valve-opening amount of the closing valve 24 starts to be increased to the predetermined amount C.

In Step S7 of FIG. 3, the signal for opening the lid door 33 is output to the lid opener 32. As a result, the lid door 33 is opened to allow refueling. Referring to time T3 in FIG. 4, it is shown that the lid door 33 is opened after the closing valve 24 is opened to the predetermined amount C. Here, immediately after the closing valve 24 is opened to the predetermined amount C in Step S6, the lid door 33 is opened in Step S7, and there is a possibility that the lid door 33 is opened before the closing valve 24 is opened to the predetermined amount C. Actually, however, even if the lid door 33 is opened, a little time is required before the refueling cap 18 is opened, and the closing valve 24 is opened in this while.

If, in Step S3, the tank pressure is not higher than the predetermined value A, the determination in Step S3 is NO, and the process from Step S11 onward is skipped, with the closing valve 24 being opened to the predetermined amount C in a short time in Step S6. The amount of vaporized fuel in the fuel tank 15 at the time of refueling is small, and therefore, in this case, even if the closing valve 24 is opened greatly all of a sudden, there is no fear of the float valve 15a being closed because the amount of vaporized fuel flowing through the vapor passage 22 is small. Thus, it is possible to shorten the time elapsing until the lid door 33 is opened to start the refueling after the turning-on of the lid switch 31.

Figure 4:
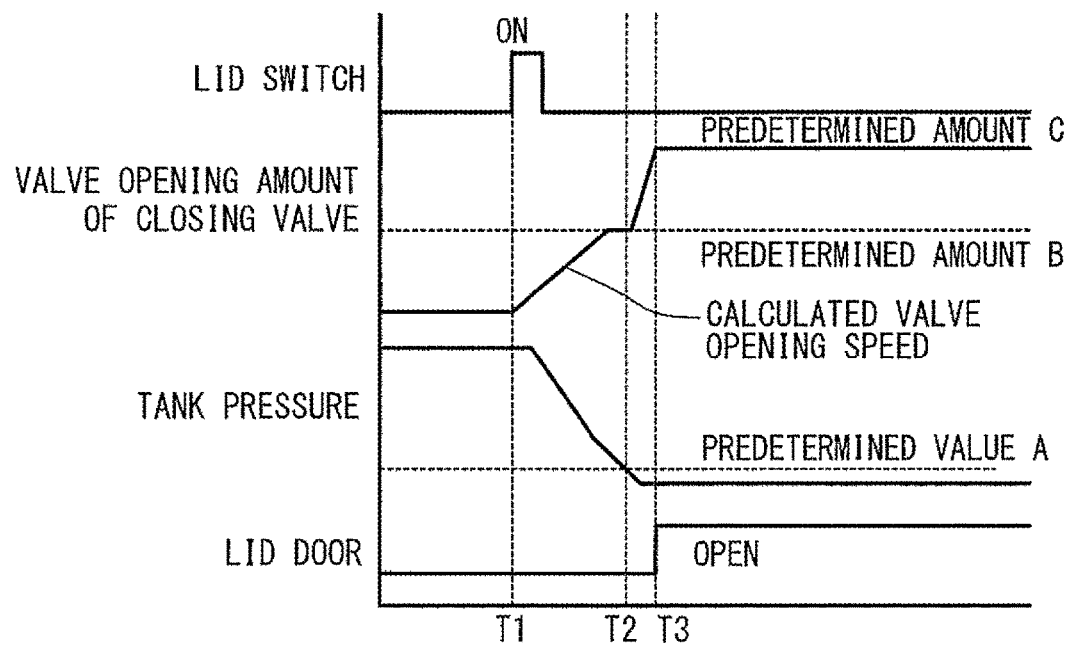
FIG. 4 is a sequential time chart illustrating the valve-opening control of the closing valve according to the first embodiment.
Figure 5:
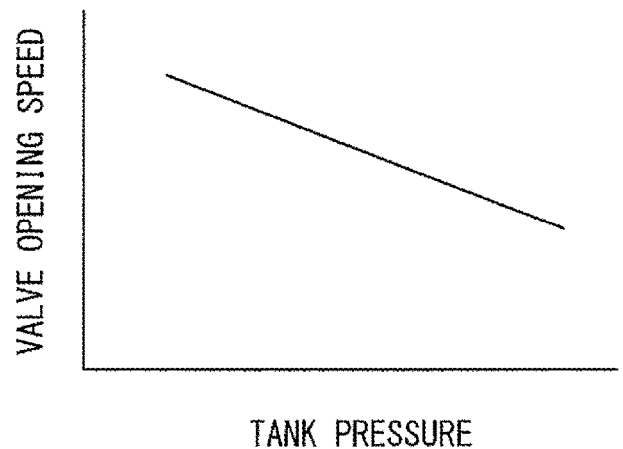
FIG. 5 is a graph illustrating the contents of a map used for obtaining the valve-opening speed of the closing valve according to the first embodiment.

In the above description, the period from time T1 to time T2 in FIG. 4 corresponds to the first stage of the opening-degree control of the closing valve 24, and the period from time T2 to time T3 corresponds to the second stage. At the first stage, the closing valve 24 is opened at a speed in accordance with the tank pressure such that the float valve 15a is not closed, and, at the second stage, the tank pressure is low and the float valve 15a is not closed even if the closing valve 24 is opened quickly, and therefore, the closing valve 24 is opened in a short time without any speed control. Here, the transition from the first stage to the second stage is effected at the time when the tank pressure becomes the predetermined value A or less, and the predetermined value A corresponds to the switching pressure at which switching from the first stage to the second stage is effected.

According to the first embodiment, if the internal pressure of the fuel tank is higher than the predetermined value A when the lid-door-open signal is output from the lid switch 31, the closing valve 24 is opened at a speed in accordance with the tank pressure at the first stage until refueling is started after the opening of the lid door 33, and the vaporized fuel in the fuel tank 15 is fed to the canister 21 to be thereby adsorbed. At the time when the tank pressure becomes the predetermined value A or less, the closing valve 24 is opened to the predetermined amount C in a short time as the second stage. Thus, during the refueling, the vaporized fuel in the fuel tank 15 is prevented from being dissipated into the atmosphere via the refueling port 17a.

In this case, at the first stage, the valve-opening control of the closing valve 24 is performed at a speed in accordance with the tank pressure, whereby the valve opening is effected within a range where the float valve 15a is not closed, and the valve-opening amount is increased in accordance with the reduction in the internal pressure of the fuel tank 15. Further, at the second stage, the closing valve 24 is opened at a speed higher than that at the first stage. Thus, throughout the first and second stages, the vaporized fuel in the fuel tank 15 can be quickly adsorbed by the canister 21 within a range where the float valve 15a is not closed, and therefore, it is possible to shorten the time until the lid door 33 is opened to allow the refueling after the output of the lid-door-open signal from the lid switch 31.

Figure 6:
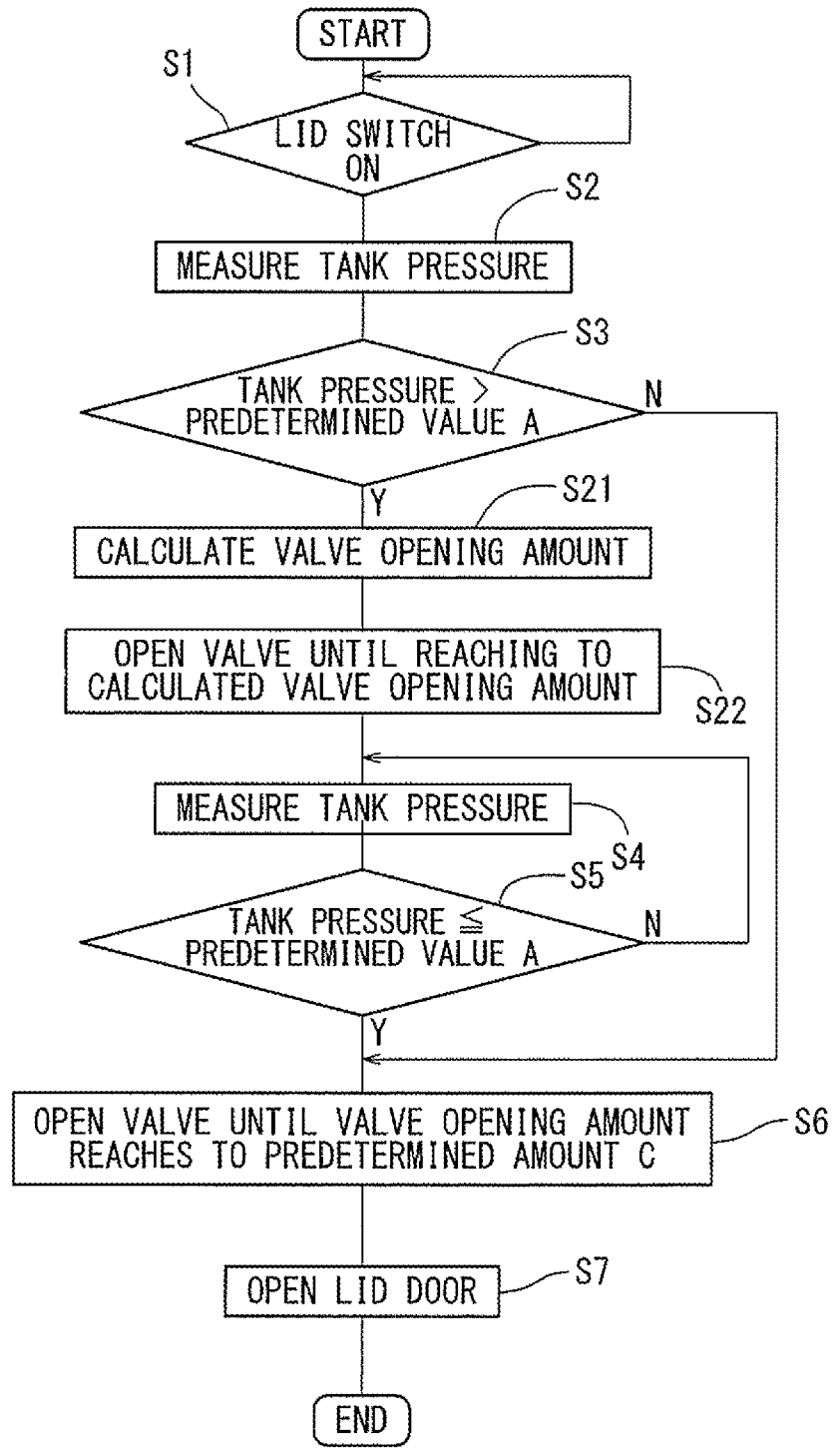
FIG. 6 is a flowchart illustrating a processing routine for a valve-opening control of a closing valve and an opening control of a lid door according to a second embodiment of the present disclosure.

FIG. 6 shows a process routine for a valve-opening control of the closing valve 24 and for an opening control of the lid door according to the second embodiment. The second embodiment is characterized in that, in contrast to the first embodiment, the valve-opening control of the closing valve 24 at the first stage is performed stepwise as in the case of the above-mentioned second stage. In other respects, the second embodiment is the same as the first embodiment, and a redundant description of the same components will be left out.

In FIG. 6, the processes in Steps S1 through S7 are the same as those in Steps S1 through S7 of FIG. 3.

Figure 8:
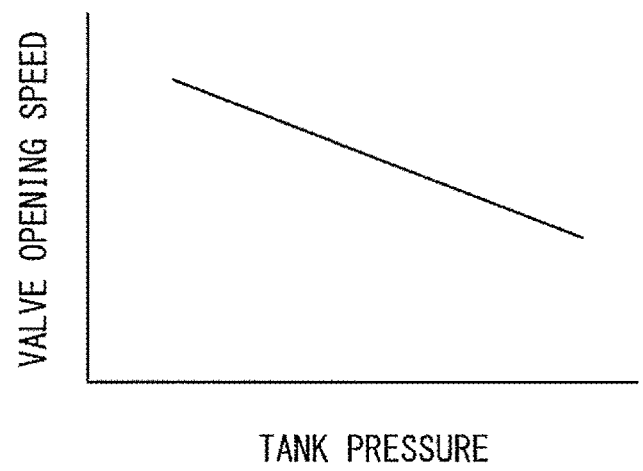
FIG. 8 is a graph illustrating the contents of a map used for obtaining the valve-opening amount of the closing valve according to the second embodiment.

In Step S21 in FIG. 6, the valve-opening amount of the closing valve 24 is calculated. This calculation is made based on a map previously stored in a memory of the control circuit 16. FIG. 8 shows the contents of the map. As is apparent from FIG. 8, in Step S21, the valve-opening amount is set in accordance with the tank pressure; the higher the tank pressure, the smaller the valve-opening amount. In the next Step S22, the closing valve 24 is opened to the valve-opening amount calculated in Step S21.

Figure 7:
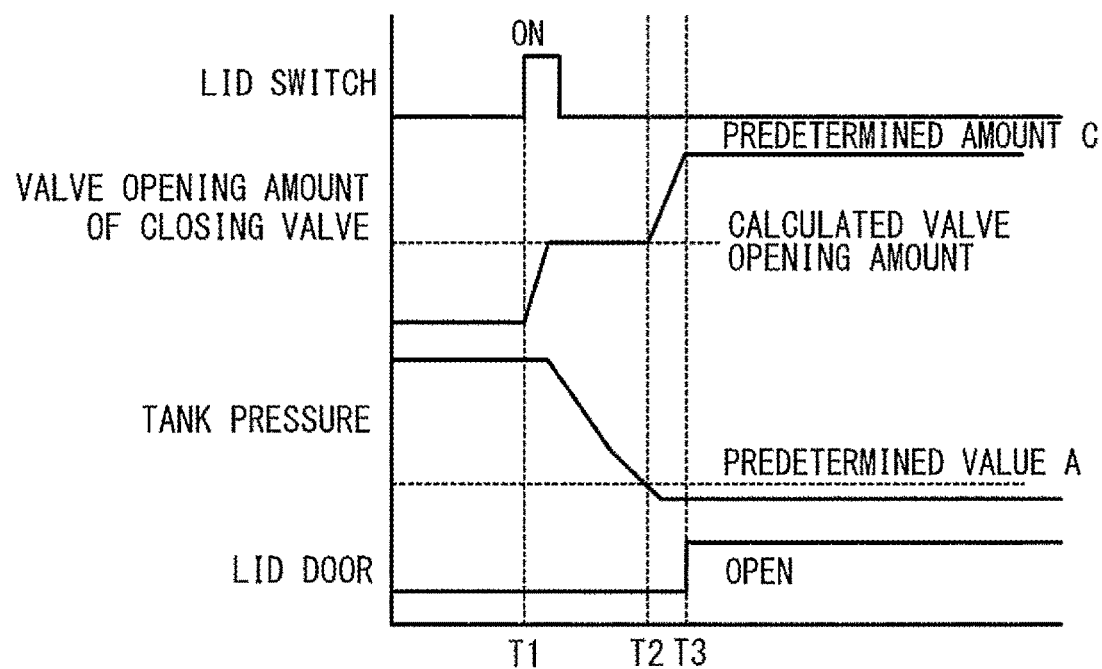
FIG. 7 is a sequential time chart illustrating the valve-opening control of the closing valve according to the second embodiment.

Referring to time T1 in FIG. 7, it is shown that in a state in which the lid switch 31 is turned on, and the tank pressure is higher than the predetermined value A, the closing valve 24 is opened to the calculated valve-opening amount. FIG. 4 shows that the tank pressure is reduced as the closing valve 24 is opened.

As in the first embodiment, in the second embodiment, the period of time elapsing until the lid door 33 is opened after the turning-on of the lid switch 31 is divided into two stages. In the first stage until the tank pressure becomes the predetermined value A or less (the period between time T1 and time T2 in FIG. 7), the closing valve 24 is controlled to be opened to a suppressed opening degree within a range where the float valve 15a is not closed; whereas in the second stage (the period between time T2 and time T3 in FIG. 7), the closing valve 24 is opened in a short time without taking conscious to the closing operation of the float valve 15a, in order to expedite the extraction of the vaporized fuel from the fuel tank 15.

In this way, because the valve-opening speed of the closing valve 24 is gradually increased in two stages, it is possible to enable the vaporized fuel in the fuel tank 15 to be quickly adsorbed by the canister 21 within a range in which the float valve 15a is not closed, making it possible to shorten the time elapsing until the lid door 33 is opened to allow refueling after the output of the lid-door-open signal from the lid switch 31. Furthermore, at the first stage, the closing valve 24 is opened stepwise in a short time within the range in which the float valve 15a is not closed, and therefore, as compared with the case where the opening degree of the closing valve 24 is gradually increased as in the first embodiment, it is possible to increase the tank pressure reduction speed to enable the opening of the lid door 33 to be made further earlier.

Figure 9:
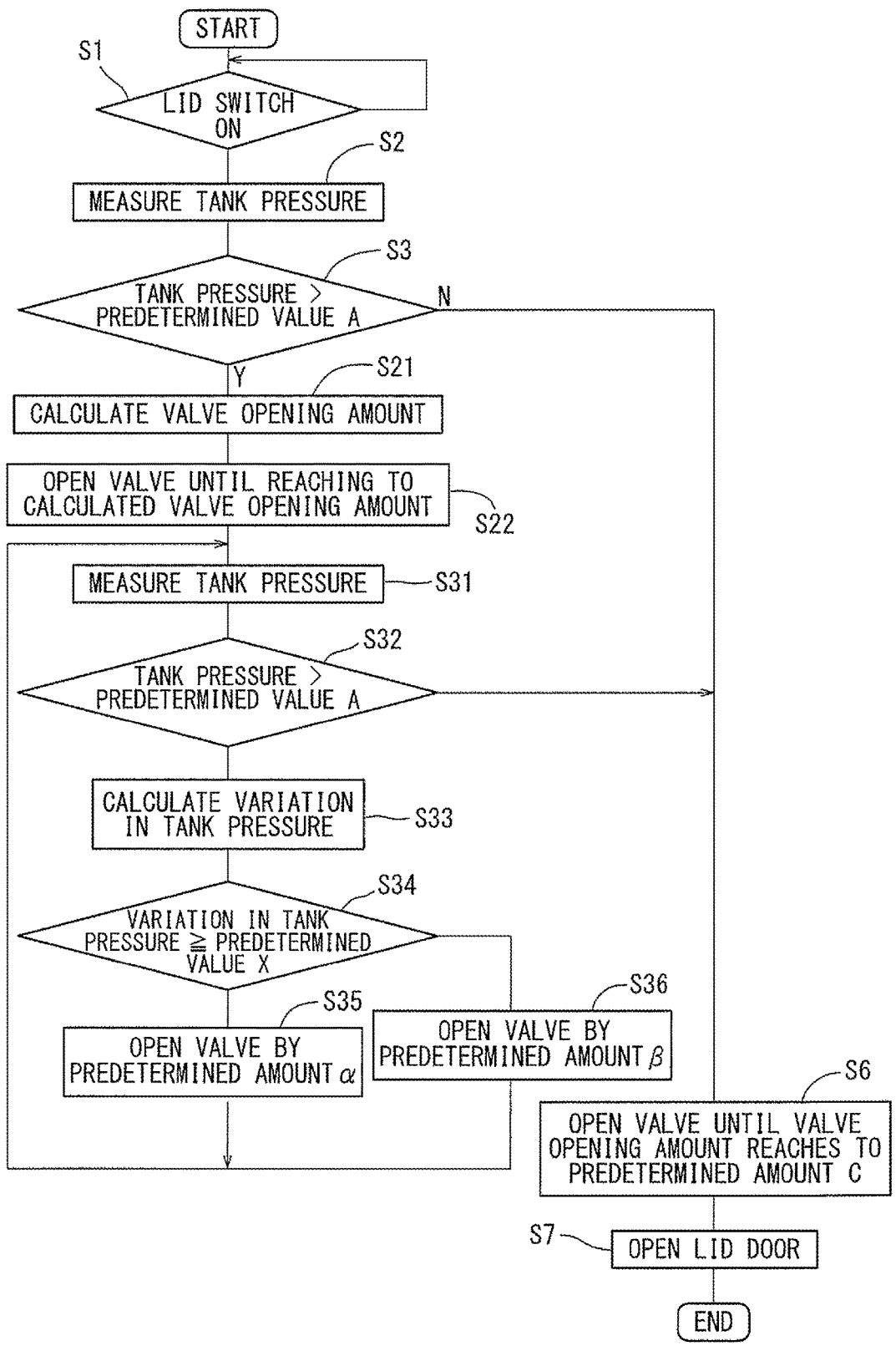
FIG. 9 is a flowchart illustrating a processing routine for a valve-opening control of a closing valve and an opening control of a lid door according to a third embodiment of the present disclosure.

FIG. 9 shows a process routine for a valve-opening control of the closing valve 24 and for an opening control of the lid door 33 according to a third embodiment. The third embodiment is characterized in that, in contrast to the second embodiment, the valve-opening amount of the closing valve 24 is feedback-controlled such that a variation in the tank pressure at the first stage has a predetermined value X. In other respects, the third embodiment is the same as the second embodiment, and a redundant description of the components will be left out.

In FIG. 9, the processes in Steps S1 through S3, the processes in Steps S21 and S22, and the processes in Steps S6 and S7 are the same as the processes in Steps S1 through S3, the processes in Steps S21 and S22, and the processes in Steps S6 and S7 in FIG. 6.

In Steps S31 and S32 in FIG. 9, the internal pressure of the fuel tank 15 detected by the internal pressure sensor 26 is measured and retrieved as in Steps S2 and S3. In Step S32, it is determined whether or not the tank pressure is higher than the predetermined value A. If the tank pressure is higher than the predetermined value A, the determination in Step S32 is YES, and the variation in the tank pressure is calculated in Step S33. Here, the variation in the tank pressure is obtained for each predetermined period of time. In the next Step S34, it is determined whether or not the obtained tank pressure variation is not less than the predetermined value X. If the obtained tank pressure variation is not less than the predetermined value X, i.e., if the determination in Step S34 is YES, the closing valve 24 is closed by a predetermined amount α in Step S35. If the tank pressure variation is less than the predetermined value X, the determination in Step S34 is NO, and the closing valve 24 is opened by a predetermined amount β in Step S36. That is, according to the processes in Steps S31 through S36, the opening degree of the closing valve 24 is feedback-controlled such that the tank pressure variation has the predetermined value X as long as the tank pressure is higher than the predetermined value A.

Figure 10:
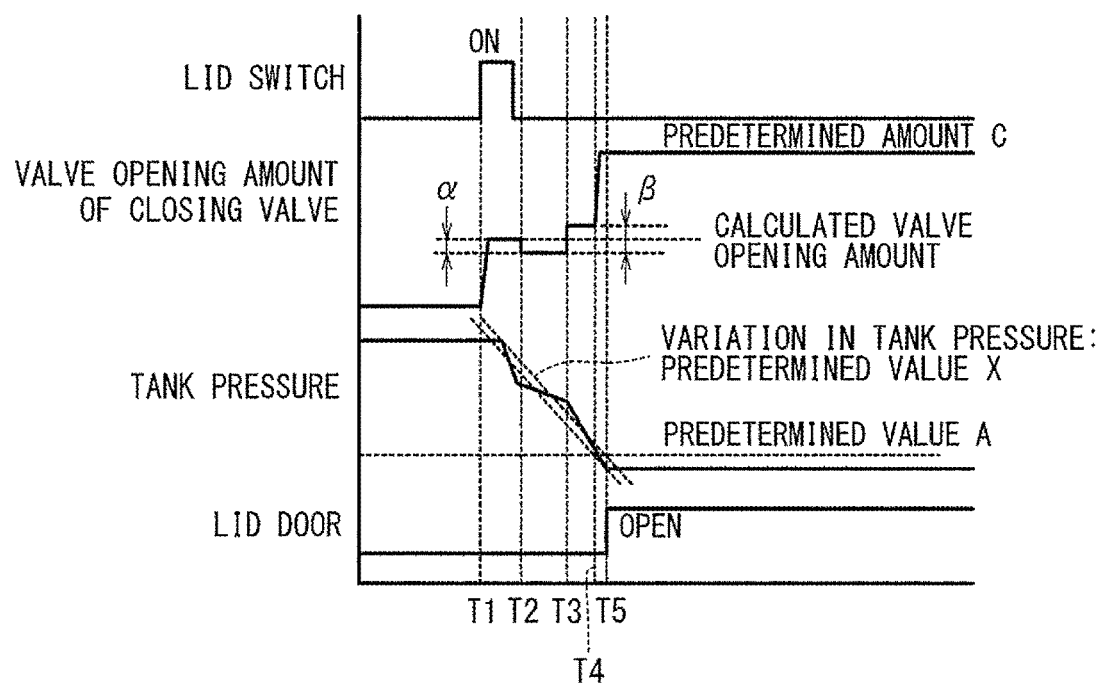
FIG. 10 is a sequential time chart illustrating the valve-opening control of the closing valve according to the third embodiment.

The variation in the tank pressure and the variation in the valve-opening amount of the closing valve 24 between time T1 and time T4 in FIG. 10 show how the feedback control is conducted. At time T4, the tank pressure is lower than the predetermined value A, so that the determination in Step S32 is NO, and the process proceeds to the processes in Step S6 and its subsequent steps, and, as described in connection with the first embodiment, the opening degree of the closing valve 24 is increased in a short time to the predetermined amount C, and the lid door 33 is opened at time T5.

According to the third embodiment, at the first stage for the valve-opening control of the closing valve 24, the valve-opening control is performed at an opening degree in accordance with the tank pressure in a range in which the float valve 15a is not closed, and, after that, the opening degree of the closing valve 24 is feedback-controlled such that the tank pressure variation has the predetermined value X. That is, as in the second embodiment, the closing valve 24 is opened stepwise, and, while expediting the extraction of the vaporized fuel in the fuel tank 15, the opening degree of the closing valve 24 is controlled such that the float valve 15a is not closed because of the speed of the extraction being too high. Thus, according to the third embodiment, the vaporized fuel in the fuel tank 15 is quickly adsorbed by the canister 21 within a range in which the float valve 15a is not closed, making it possible to shorten the time elapsing until the lid door 33 is opened to allow refueling after the output of the lid-door-open signal from the lid switch 31.

Figure 11:
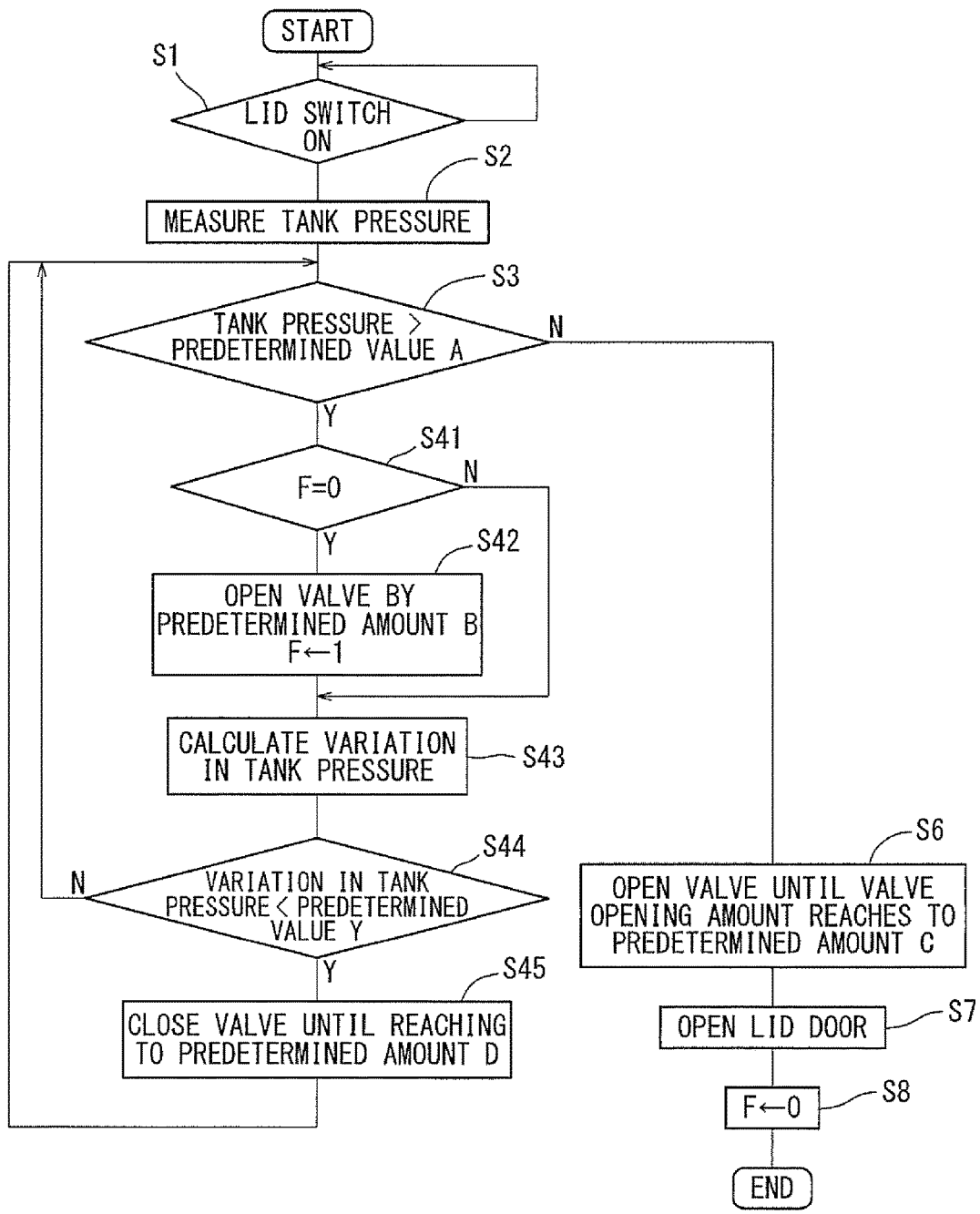
FIG. 11 is a flowchart illustrating a processing routine for a valve-opening control of a closing valve and an opening control of a lid door according to a fourth embodiment of the present disclosure.

FIG. 11 shows a process routine for a valve-opening control of the closing valve 24 and for an opening control of the lid door 33 according to a fourth embodiment. The fourth embodiment is characterized in that, in contrast to the third embodiment, if the float valve 15a is closed while the closing valve 24 is being valve-opening-controlled in the first stage, the float valve 15a is opened again, making it possible to continue the valve-opening control of the closing valve 24 in the first stage. In other respects, the fourth embodiment is basically the same as the third embodiment, and a redundant description of the components will be left out.

In FIG. 11, the processes in Steps S1 through S3 and the processes in Steps S6 and S7 are the same as the processes in Steps S1 through S3 and the processes in Steps S6 and S7 in FIG. 9.

In Steps S41 and S42 in FIG. 11, if it is determined in Step S3 that the tank pressure is higher than the predetermined value A, the closing valve 24 is opened only once to the predetermined amount B. Once the valve is opened in Step S42, a flag F is set, and the determination in Step S41 in the next process is NO, so that the process in Step S42 is skipped and is not executed.

Figure 12:
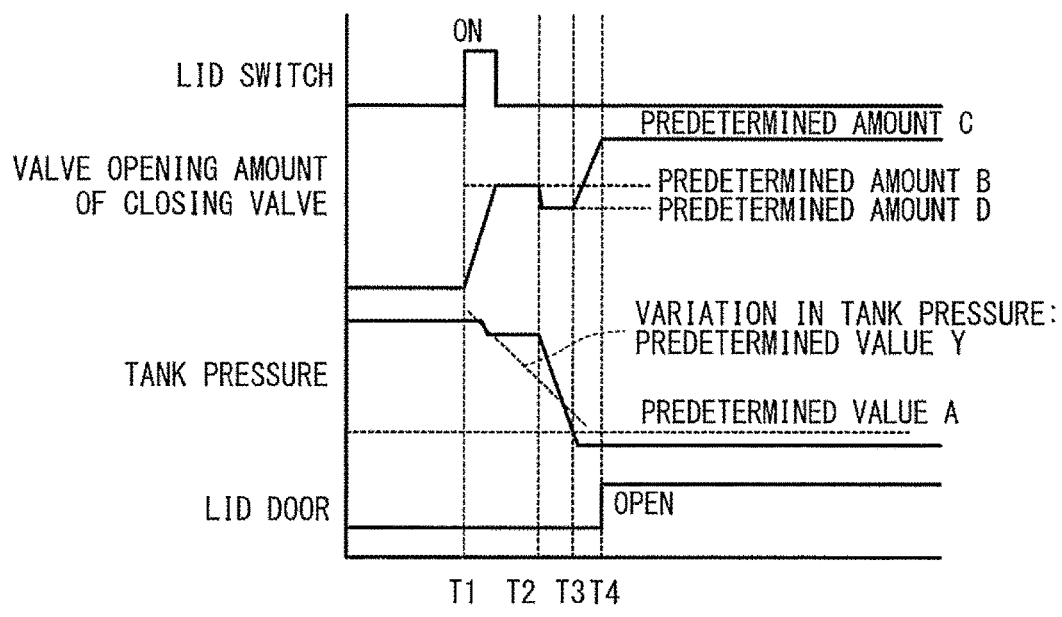
FIG. 12 is a sequential time chart illustrating the valve-opening control of the closing valve according to the fourth embodiment.

Referring to time T1 in FIG. 12, it is shown that the lid switch 31 is turned on, and the closing valve 24 is opened to the predetermined amount B in the state in which the tank pressure is higher than the predetermined value A. And, the tank pressure is reduced as the closing valve 24 is opened.

Next, in Step S43, the variation in the tank pressure is calculated. Here, the tank pressure variation for each predetermined period of time is obtained. In the next Step S44, it is determined whether or not the obtained tank pressure variation is less than a predetermined value Y. The predetermined value Y is determined to be a minimum possible tank pressure variation that may be caused when the float valve 15a is open; if, during the control, the float valve 15a is closed, and the tank pressure variation becomes smaller than the predetermined value Y, the determination in Step S44 is YES, and, in Step S45, the closing valve 24 is closed to a predetermined amount D.

Referring to time T2 in FIG. 12, it is shown how the process proceeds at that time. In this way, if the float valve 15a is opened again as a result of that the closing valve 24 is closed to the predetermined amount D when the float valve 15a is closed, the tank pressure is reduced with passage of time after time T2 as shown in FIG. 12.

If the tank pressure has been reduced in the normal fashion, the determination in Step S44 is NO, and the above process is continued until the tank pressure becomes to have the predetermined value A or less; at time T3 when the tank pressure becomes the predetermined value A or less, the determination in Step S3 is NO, and the process proceeds from Step S6 onward; as described in connection with the first embodiment, the opening degree of the closing valve 24 is increased to the predetermined amount C in a short time, and, at time T4, the lid door 33 is opened. And, the flag F is reset in Step S8 to attain the initial state.

According to the fourth embodiment, at the first stage of the valve-opening control of the closing valve 24, the closing valve 24 is controlled to be opened stepwise relatively greatly, and, after this, if it is detected that the float valve 15a has been closed, the opening degree of the closing valve 24 is reduced. That is, the closing valve 24 is greatly opened from the first, and, if the float valve 15a is closed, the closing valve is closed a little, thus controlling the opening degree of the closing valve 24 such that the vaporized fuel in the fuel tank 15 is quickly extracted so long as the float valve 15a is not operated to close.

Thus, according to the fourth embodiment, the vaporized fuel in the fuel tank 15 is quickly adsorbed by the canister 21 within a range in which the float valve 15a is not closed, making it possible to shorten the time elapsing until the lid door 33 is opened to allow refueling after the output of the lid-door-open signal from the lid switch 31.

Figure 13:
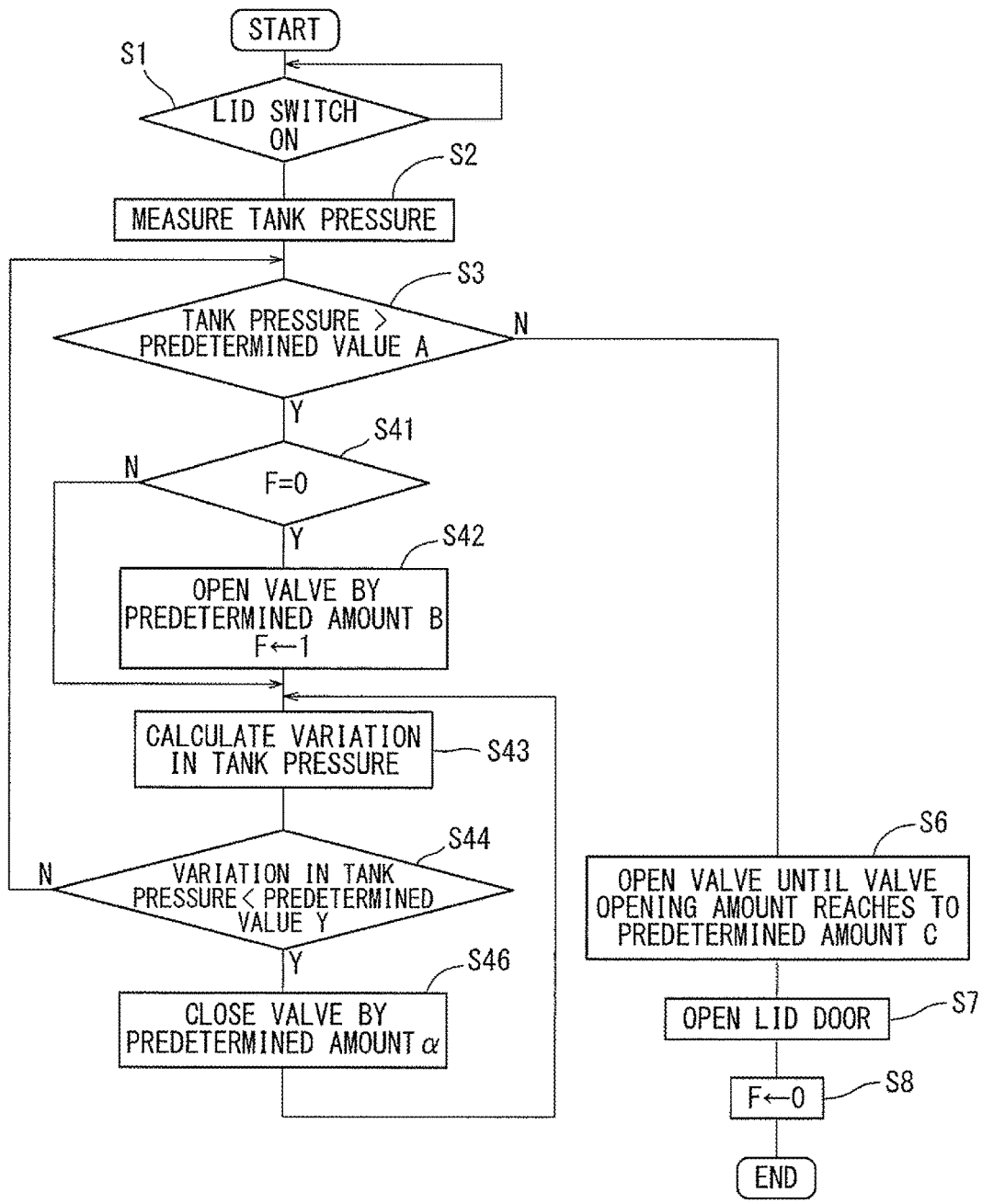
FIG. 13 is a flowchart illustrating a processing routine for a valve-opening control of a closing valve and an opening control of a lid door according to a fifth embodiment of the present disclosure.

FIG. 13 shows a process routine for a valve-opening control of the closing valve 24 and for an opening control of the lid door 33 according to a fifth embodiment. The fifth embodiment is characterized in that, in contrast to the fourth embodiment, if the float valve 15a is closed while the closing valve 24 is undergoing valve-opening control at the first stage, the opening degree of the closing valve 24 is gradually reduced until the float valve 15a is opened again, making it possible to restore the valve-opening control of the closing valve 24 for reducing the tank pressure. In other respects, the fifth embodiment is the same as the fourth embodiment, and a redundant description of the components will be left out.

In FIG. 13, the processes in Steps S1 through S3, the processes in Steps S41 through S44, and the processes in Steps S6 through S7 are the same as the processes in Steps S1 through S3, the processes in Steps S41 through S44, and the processes in Steps S6 through S8 in FIG. 11.

In Step S46 in FIG. 13, the closing valve 24 is closed by the predetermined amount α if the float valve 15a is closed during the control, and the tank pressure variation becomes smaller than the predetermined value Y, with the determination in Step S44 being NO. After that, the processes in Steps S43 through S46 are repeated.

Figure 14:
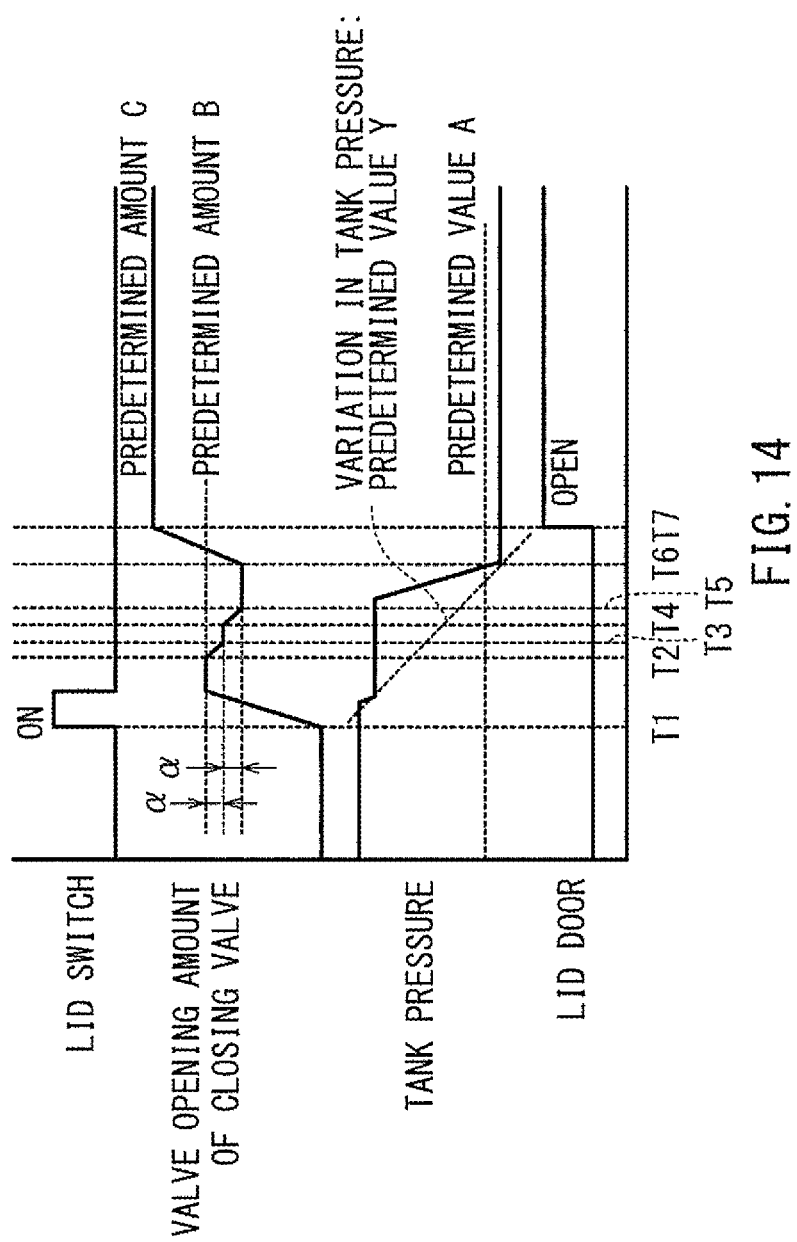
FIG. 14 is a sequential time chart illustrating the valve-opening control of the closing valve according to the fifth embodiment.

Time T2 through time T5 in FIG. 14 show how the above process is conducted in this time. After time T5, if the tank pressure variation becomes to have the predetermined value Y or more, the determination in Step S44 is NO, and the above process is continued until the tank pressure becomes the predetermined value A or less; at time T6 when the tank pressure becomes to have the predetermined value A or less, the determination in Step S3 is NO, and the process proceeds from Step S6 onward; then, as described in the first embodiment, the opening degree of the closing valve 24 is increased to the predetermined amount C in a short time, and the lid door 33 is opened at time T7. Thereafter, in Step S8, the flag F is reset to attain the initial state.

According to the fifth embodiment, at the first stage of the valve-opening control of the closing valve 24, the closing valve 24 is opened relatively greatly stepwise; after this, if it is detected that the float valve 15a has been closed, the opening degree of the closing valve 24 is reduced by the predetermined amount α until the float valve 15a is opened again. That is, the closing valve 24 is opened greatly from the first, and if the float valve 15a is closed, the closing valve 24 is closed until the float valve 15a is opened again, thus controlling the opening degree of the closing valve 24 such that the vaporized fuel in the fuel tank 15 is quickly extracted so long as the float valve 15a is not closed.

Thus, according to the fifth embodiment, the vaporized fuel in the fuel tank 15 is quickly adsorbed by the canister 21 within a range in which the float valve 15a is not closed, making it possible to shorten the time elapsing until the lid door 33 is opened to allow refueling after the output of the lid-door-open signal from the lid switch 31.

The processes in the flowcharts of the first through fifth embodiments excluding the process in Step S7 correspond to the closing valve control means according to the present disclosure. The process in Step S7 of each of the flowcharts of the first through fifth embodiments corresponds to the lid door opening means according to the present disclosure.

Figure 15:
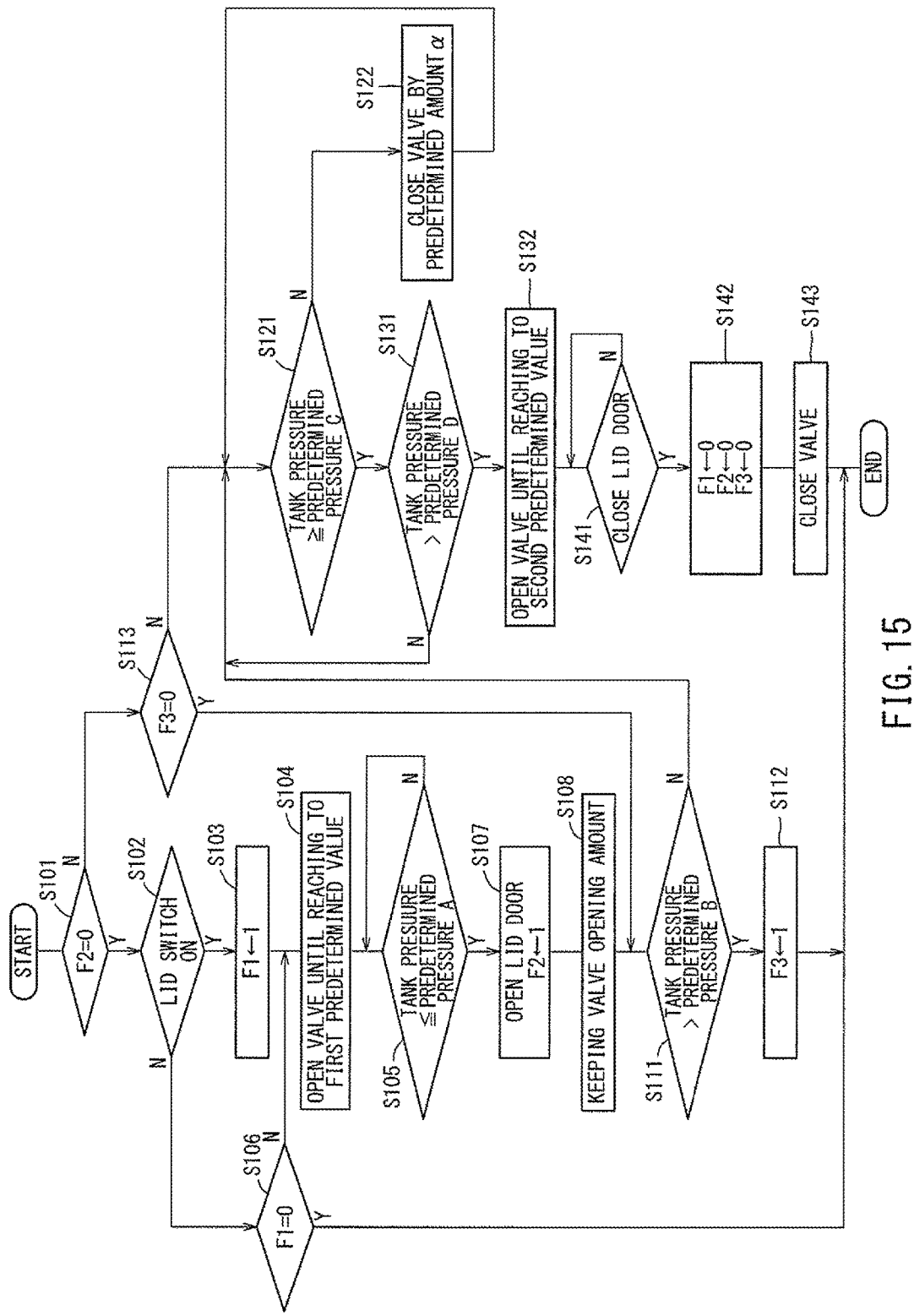
FIG. 15 is a flowchart illustrating a processing routine for a valve-opening control of a closing valve and an opening control of a lid door according to a sixth embodiment of the present disclosure.

FIG. 15 shows a sixth embodiment. In the sixth embodiment, the closing valve 24 is opening/closing-controlled to adjust the internal pressure of the fuel tank 15, whereby the amount of vaporized fuel generated in the fuel tank during refueling and circulated through the breather pipe 19 is properly adjusted. Thus, by executing the sixth embodiment in addition to the first embodiment described above, it is possible to achieve the following advantage in addition to the advantage achieved by the first embodiment. That is, without adjusting the flow resistance of the breather pipe 19, which is of high difficulty, the closing valve 24 serves to function as the pressure adjustment means to adjust the internal pressure of the fuel tank 15, making it possible to properly adjust the amount of the vaporized fuel circulated via the breather pipe 19 independently of environmental changes such as a change in the ambient temperature.

Here, a process routine for a valve-opening control of the step motor type closing valve 24 and for an opening control of the lid door 33 performed by the control circuit 16 will be described based on the flowchart of FIG. 15 with reference to the time chart of FIG. 16.

As the process of this routine is executed, it is determined in Step S101 whether or not a flag F2 described below is in a reset state. The flag F2 is in the reset state at first, so that the determination in Step S101 is YES, and, in the next Step S102, it is determined whether or not the lid switch 31 is turned on. Here, after the turning-on of the lid switch 31 is waited for, if the lid switch 31 is turned on, the determination in Step S102 is YES, and, in Step S103, the flag F1 for recording the turning-on of the lid switch 31 is set. In the next Step S104, the closing valve 24 is opened to the first predetermined value. This process is performed in order to extract the vaporized fuel accumulated in the fuel tank 15 before starting the refueling. As a result, the internal pressure of the fuel tank 15 (hereinafter also referred to as the tank pressure) is reduced. Time T1 and time T2 in FIG. 16 show what occurs in this while.

If the vaporized fuel in the fuel tank 15 has been smoothly extracted to be adsorbed by the canister 21, and the tank pressure is reduced to the predetermined pressure A or less, the determination in Step S105 is YES, and, in Step S107, an open signal is output to a lid opener 32 to open the lid door 33. Due to the above processes from the turning-on of the lid switch 31 onward, the vaporized fuel in the fuel tank 15 is prevented from leaking out via the refueling port 17a when the refueling cap 18 is detached. If the lid door 33 is opened in the process in Step S107, the flag F2 for recording that state is set. Thereafter, in Step S108, the valve-opening amount of the closing valve 24 at that time is kept.

Figure 16:
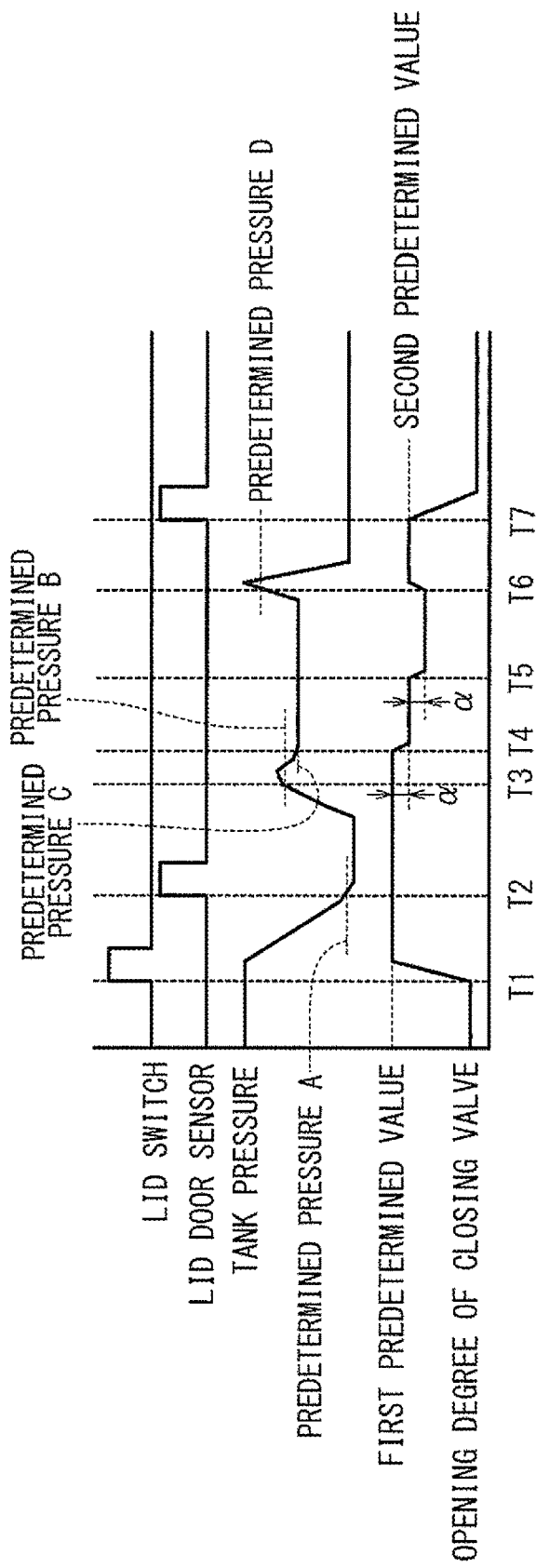
FIG. 16 is a sequential time chart illustrating the valve-opening control of the closing valve according to the sixth embodiment.

The lid switch 31 is operated only with one-touch, and therefore, as shown in FIG. 16, it only generates a pulse-shaped signal. As described above, once the lid switch 31 is turned on, the flag F1 is brought into the set state, with an occurrence of the turning-on operation being stored, and, even in case that the turning-on operation of the lid switch 31 has been finished to the result that the determination in Step S102 is NO, the determination in the next Step S106 is NO, and the processes from Step S104 onward are continued.

If the lid door 33 is opened and refueling is started, the tank pressure abruptly increases as indicated for the period between time T2 and time T3 of FIG. 16. This is due to the fact that the vaporized fuel is generated in the fuel tank 15 as the refueling is conducted. As a result, if the tank pressure exceeds a predetermined pressure B (which corresponds to the peak of the internal pressure), the determination in Step S111 is YES. And, in the next Step S112, a flag F3 is brought into the set state, recording that the tank pressure has temporarily exceeded the predetermined pressure B. The process of checking in this way that the tank pressure has exceeded the predetermined pressure B is performed for the purpose of making sure that the refueling is being performed as planned.

As described above, if the flag F2 and the flag F3 are brought into the set state, in the processes performed after that, the determination in Step S101 is NO, and the determination in Step S113 is also NO, and therefore, in Step S121, it is determined whether or not the tank pressure is not less than a predetermined pressure C (which corresponds to the first pressure or the first set pressure according to the present disclosure). If, as indicated at time T4 in FIG. 16, the tank pressure is lower than the predetermined pressure C, the determination in Step S121 is NO, and, in Step S122, the closing valve 24 is closed by the predetermined amount α (which corresponds to the first predetermined amount according to the present disclosure). If the tank pressure is lower than the predetermined pressure C even at time T5 in FIG. 16, the closing valve 24 is again closed by the predetermined amount α in Step S122.

The above process is performed for the following purpose: after starting the refueling, the tank pressure, which has been once increased, is reduced as the vaporized fuel is reduced; for this reason, an adjustment is made such that the reduction in the tank pressure is suppressed to the result that the amount of the vaporized fuel circulated to a region of the refueling port 17a of the fuel tank 15 via the breather pipe 19 does not become too small. This is to cope with a problem that, if the amount of the vaporized fuel circulated through the breather pipe 19 is reduced, atmospheric air is caught to flow into the fuel tank 15 via the refueling port 17a. If the atmospheric air flows into the fuel tank 15, the density of the vaporized fuel in the fuel tank 15 is lowered by the atmospheric air to the result that vaporized fuel is likely to be generated anew in the fuel tank 15, and, eventually, it becomes necessary to increase the size of the canister 21.

When time T6 in FIG. 16 is reached, the tank pressure has increased abruptly to exceed a predetermined pressure D. If the tank pressure exceeds the predetermined pressure D, the auto stop function of the refueling gun is exerted to stop refueling from the refueling gun. This abrupt increase in the tank pressure is caused by the closing of the float valve 15a. The float valve 15a is closed if the tank is filled up, or if the flow velocity of the vaporized fuel flowing to the closing valve 24 through the vapor passage 22 is high. If the float valve 15a has been closed due to the latter cause, it is necessary to remove the cause to continue the refueling. In view of this, if the tank pressure exceeds the predetermined pressure D to the result that the determination in Step S131 is YES, the closing valve 24 is opened to a second predetermined value in Step S132. If the float valve 15a is closed because of the latter cause, the closing valve 24 is thus opened, whereby the float valve 15*a* is opened again, making it possible to continue the refueling.

If, however, the float valve 15*a* has been closed because of the former cause, the float valve 15*a* is not opened even if the closing valve 24 is opened, and therefore, the refueling is terminated. At that time, if the lid door 33 is closed, a lid door sensor 34 detects that and generates a detection signal. In Step S141, upon receipt of the detection signal, it is detected that the lid door 33 has been closed, and, in the next Step S142, the flags F1, F2, and F3 are reset to be restored to the initial state, and the closing valve 24 is closed in Step S143. For time T7 and after that time in FIG. 16, it is shown how this process is performed.

According to the sixth embodiment, the adjustment of the flow resistance of the breather pipe 19, which is of high difficulty, is not performed as in the prior art; instead, the closing valve 24 disposed in the path connecting the fuel tank 15 and the canister 21 serves to function as the pressure adjustment means to adjust the internal pressure of the fuel tank 15, making it possible to properly adjust the amount of the vaporized fuel circulated via the breather pipe 19 during refueling.

Figure 17:
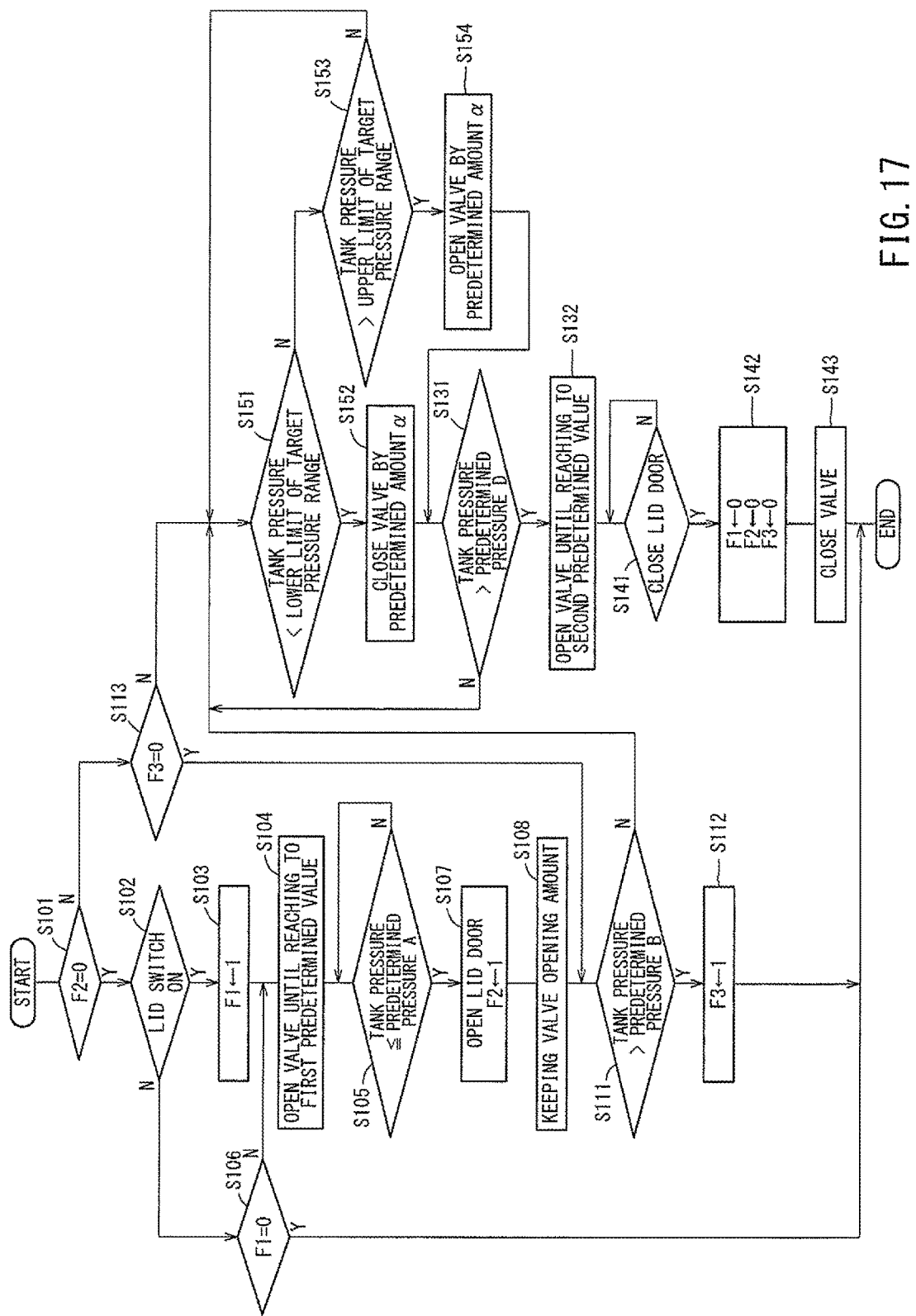
FIG. 17 is a flowchart illustrating a processing routine for a valve-opening control of a closing valve and an opening control of a lid door according to a seventh embodiment of the present disclosure.

FIG. 17 shows a process routine for a valve-opening control of the closing valve 24 and for an opening control of the lid door 33 according to a seventh embodiment. The seventh embodiment is characterized in that, in contrast to the sixth embodiment in which the tank pressure during refueling is suppressed to the predetermined pressure C or less, the tank pressure is controlled to be within a target pressure range. In other respect, the seventh embodiment is the same as the sixth embodiment, and a redundant description of the components will be left out.

In FIG. 17, the processes in Steps S121 and S122 in FIG. 15 are replaced by those in Steps S151 through S154. In other respects, the same process is performed.

Figure 18:
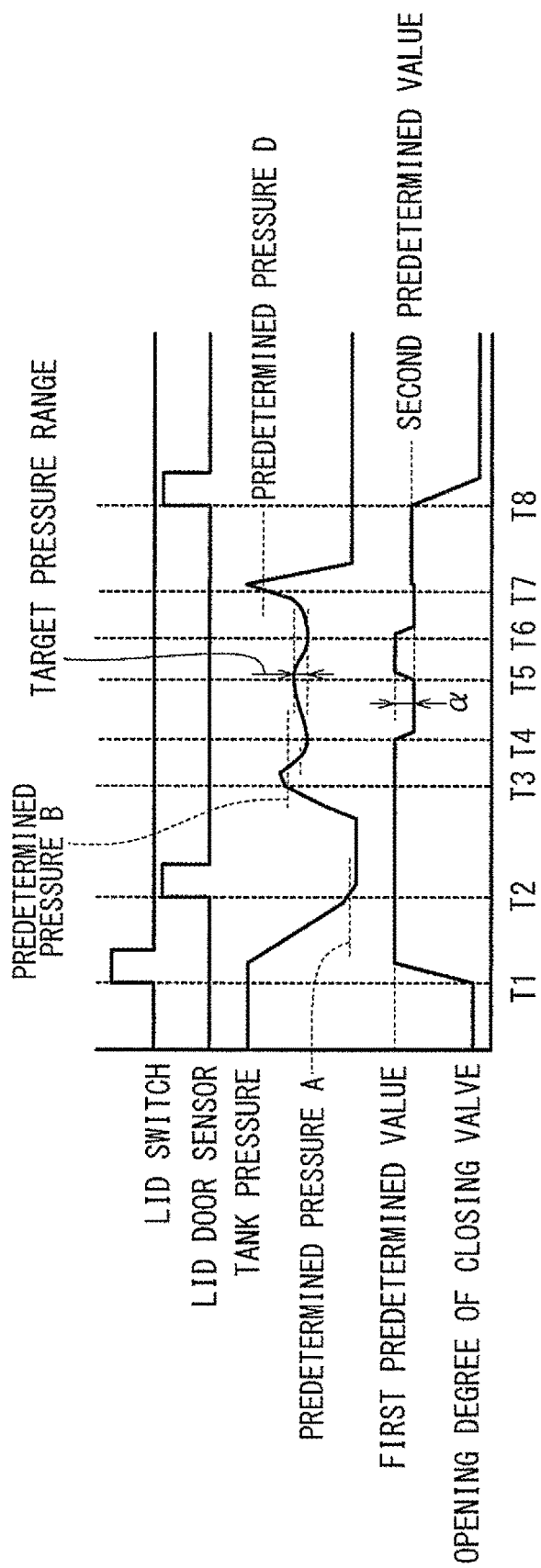
FIG. 18 is a sequential time chart illustrating the valve-opening control of the closing valve according to the seventh embodiment.

In Step S151 of FIG. 17, it is determined whether or not the tank pressure is lower than the lower limit of the target tank pressure range (which corresponds to the first pressure according to the present disclosure). If the tank pressure is lower than the lower limit of the target tank pressure range, the determination in Step S151 is YES, and, in Step S152, the closing valve 24 is closed by the predetermined amount α. Referring to time T4 in FIG. 18 it is shown how the above process is performed. On the other hand, if the tank pressure is not less than the target tank pressure range, the determination in Step S151 is NO, and, in Step S153, it is determined whether or not the tank pressure is higher than the upper limit of the target pressure range. If the tank pressure is higher than the upper limit of the target pressure range, the determination in Step S153 is YES, and, in Step S154, the closing valve 24 is opened by the predetermined amount α. Referring to time T5 in FIG. 18, it is shown how the above process is performed. Referring to time T6, it is shown that the tank pressure becomes lower than the lower limit of the target pressure range again, and the closing valve 24 is closed by the predetermined amount α.

In this way, the closing valve 24 is opening/closing-controlled such that the tank pressure is within the target pressure range (which corresponds to the second set pressure according to the present disclosure). After starting the refueling, the tank pressure, which is once increased, is reduced as the vaporized fuel is reduced; in view of this, the above process is performed to control the tank pressure within the target pressure range, so that the amount of the vaporized fuel circulated to a region of the refueling port 17*a* of the fuel tank 15 via the breather pipe 19 does not become too small.

Figure 19:
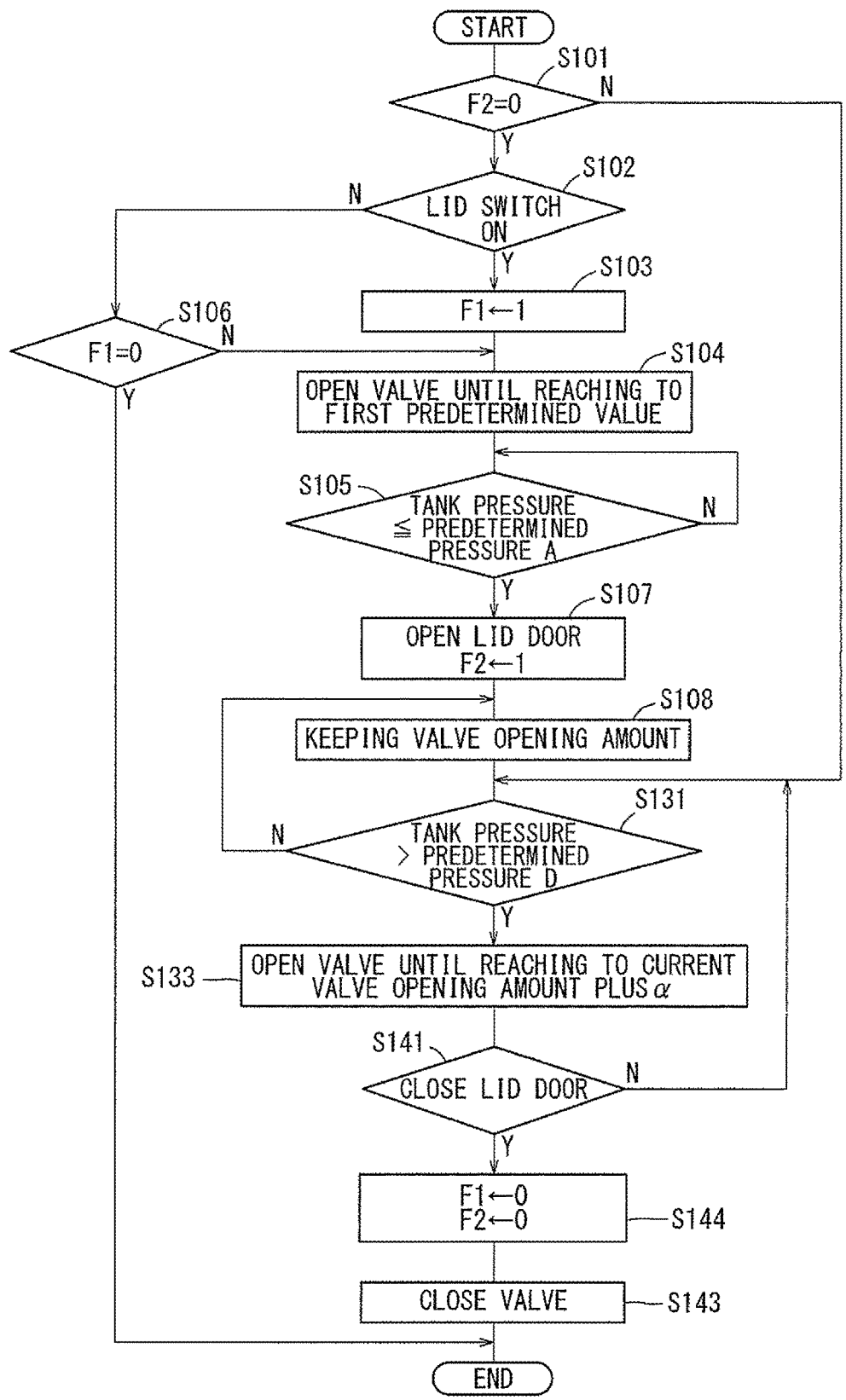
FIG. 19 is a flowchart illustrating a processing routine for a valve-opening control of a closing valve and an opening control of a lid door according to an eighth embodiment of the present disclosure.

FIG. 19 shows a process routine for a valve-opening control of the closing valve 24 and an opening control of the lid door 33 according to an eighth embodiment. The eighth embodiment is characterized in that, in contrast to the sixth embodiment, in which the tank pressure during the refueling is suppressed to the predetermined pressure C or less, the tank pressure is controlled to be lower than the pressure at which the auto stop function of the refueling gun is exerted. In other respects, the eighth embodiment is substantially the same as the sixth embodiment, and a redundant description of the components will be left out.

In FIG. 19, the processes in Steps S101 through S108 are the same as those in Steps S101 through S108 in FIG. 15.

In Step S131 in FIG. 19, it is determined whether or not the tank pressure has exceeded the predetermined pressure D. If the tank pressure has not exceeded the predetermined pressure D, the determination in Step S131 is NO, and the valve-opening amount of the closing valve 24 is kept in Step S108, whereas, if the tank pressure exceeds the predetermined pressure D, the determination in Step S131 is YES, and the valve-opening amount of the closing valve 24 is increased by α. This is indicated for time T3 in FIG. 20. The tank pressure may exceed the predetermined pressure D because of closing of the float valve 15*a*; in this case, the auto stop function of the refueling gun is exerted to stop the refueling from the refueling gun, so that the generation of vaporized fuel accompanying with the refueling operation ceases, and the tank pressure is abruptly reduced. At this time, if the closing of the float valve 15*a* is caused because of the high flow velocity of the vaporized fuel flowing to the closing valve 24 through the vapor passage 22, the float valve 15*a* can be opened again due to the reduction in the tank pressure, and the refueling can be continued.

Figure 20:
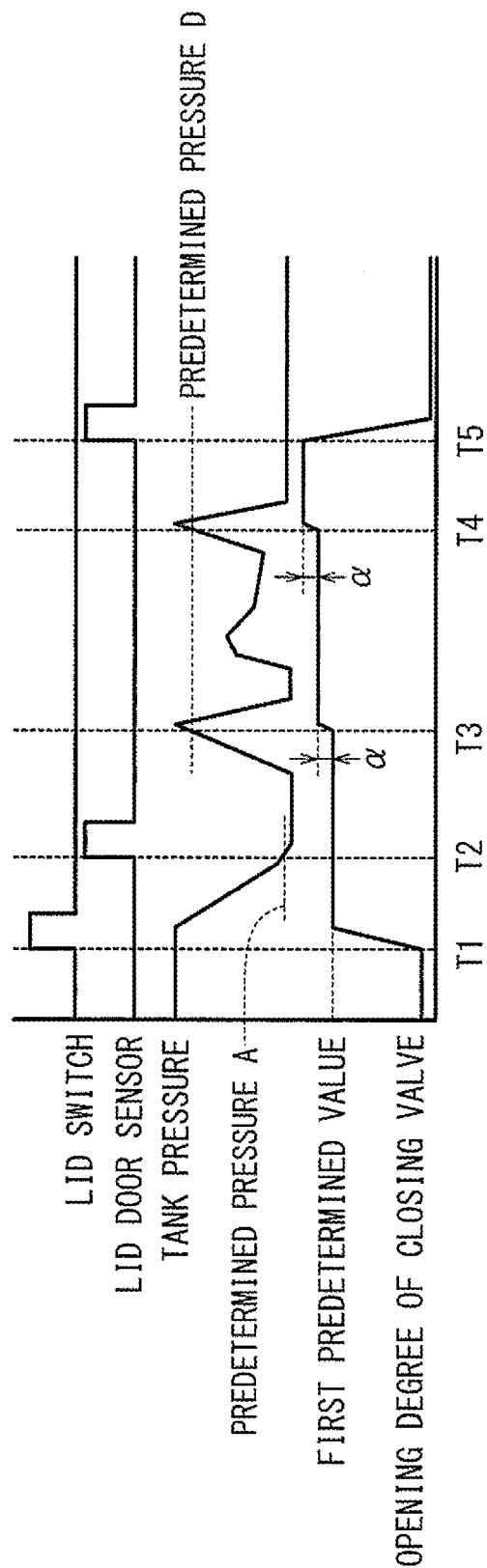
FIG. 20 is a sequential time chart illustrating the valve-opening control of the closing valve according to the eighth embodiment.

In the period between time T3 and time T4 in FIG. 20, the amount of vaporized fuel generated in the fuel tank is increased as the refueling is restarted, and the tank pressure increases again. Then, at time T4, the tank pressure exceeds the predetermined pressure D, so that the refueling is stopped. At this time, the opening degree of the closing valve 24 is increased again by α. In the case that the closing of the float valve 15*a* at this time is occurred because the tank has been filled up, the generation of the vaporized fuel is suppressed as the refueling is stopped, and the float valve 15*a* is not opened again even if the tank pressure is abruptly reduced, so that the refueling is remained at rest, and the lid door 33 is closed for terminating the refueling. If the lid door 33 is closed at time T5 in FIG. 20, and the lid door sensor 34 generates the detection signal, the determination in Step S141 is YES, and, in Step S144, the flags F1 and F2 are reset to be restored to the initial state, and the closing valve 24 is closed in Step S143.

According to the eighth embodiment, for the situation in which the internal pressure of the fuel tank 15 is too high, the closing valve 24 is opened by α extra at each time the internal pressure becomes too high, thereby suppressing an excessive increase in the tank pressure. Due to this arrangement, an adjustment is made such that the amount of the vaporized fuel circulated to the region of the refueling port 17*a* of the fuel tank 15 via the breather pipe 19 does not become excessively large. Here, the predetermined pressure D corresponds to the second pressure according to the present disclosure, and the valve-opening amount α of the closing valve 24 corresponds to the second predetermined amount according to the present disclosure.

While in the above description the predetermined pressure D is equal to the pressure at which the auto stop function of the refueling gun is exerted, it may also be a pressure slightly lower than the pressure at which the auto stop function of the refueling gun is exerted. In this case, before the auto stop function of the refueling gun is exerted, the opening degree of the closing valve 24 is increased, and the tank pressure is suppressed to be low. Due to this arrangement, the tank pressure can be suppressed to a pressure slightly lower than the pressure at which the auto stop function is exerted; further, it is possible to prevent the auto stop function from being inadvertently exerted, making it possible to smoothly perform the refueling operation without interruption.

The processes in Steps S121, S122, S131, and S132 in the flowchart of FIG. 15 of the sixth embodiment correspond to the closing valve control means according to the present disclosure. Further, the processes in Steps S151 through 154 and the processes in Steps S131 and S132 in the flowchart of FIG. 17 of the seventh embodiment correspond to the closing valve control means according to the present disclosure. Further, the processes in Steps S131 and S133 in the flowchart of FIG. 19 of the above-described eighth embodiment correspond to the closing valve control means according to the present disclosure.

Although the specific embodiments have been described, the present disclosure is not limited to the appearances and constructions of these embodiments, and it is possible to make various changes, additions and omissions. For example, although the closing valve in the above embodiments is the step motor type closing valve 24, it may also be a ball valve configured to continuously vary the valve opening amount according to the rotation of a ball-shaped valve member. Further, although the present disclosure is applied to a vehicle engine system, the present disclosure may not be limited to the application to the vehicle engine system. In case of the application to the vehicle engine system, it may be possible to also be applied to a hybrid vehicle where an engine and a motor are used in a combination.

The invention claimed is:

1. A vaporized fuel processing apparatus comprising:
   a canister configured to adsorb vaporized fuel generated within a fuel tank such that the adsorbed vaporized fuel is drawn into an engine;
   a closing valve configured to control communication between the fuel tank and the canister and provided in a path connecting the fuel tank and the canister;
   a float valve configured to prevent fuel from flowing out into the path from the fuel tank;
   a refueling switch configured to output a refueling start signal that indicates a start of refueling to the fuel tank;
   an internal pressure sensor detecting a pressure of a space inside the fuel tank as an internal pressure; and
   a closing valve control device configured to control the closing valve; wherein:
   if the refueling start signal is output from the refueling switch while the internal pressure of the fuel tank detected by the internal pressure sensor is higher than a set pressure that is previously set, the closing valve control device is configured to open the closing valve within a range in which the float valve does not operate, and the closing valve control device is further configured to increase the valve-opening speed of the closing valve in accordance with a reduction in the internal pressure of the fuel tank from a valve opening start time.

2. The vaporized fuel processing apparatus according to claim 1, wherein the closing valve control device is further configured to perform an opening-degree control of the closing valve from the valve opening start time at least in two stages, in which, in comparison with a first stage at the valve opening start time, an opening degree is larger and a valve opening speed is higher at a second stage after the first stage.

3. The vaporized fuel processing apparatus according to claim 2, wherein the closing valve control device is further configured to control the opening degree of the closing valve in accordance with the internal pressure of the fuel tank at the first stage and open the closing valve stepwise by a predetermined amount at the second stage.

4. The vaporized fuel processing apparatus according to claim 3, wherein, at the first stage, the closing valve control device is further configured to control the valve-opening speed of the closing valve in accordance with the internal pressure of the fuel tank detected by the internal pressure sensor such that the higher the internal pressure, the lower the valve-opening speed.

5. The vaporized fuel processing apparatus according to claim 2, wherein, at the first and second stages, the closing valve control device is further configured to increase stepwise the opening degree of the closing valve.

6. The vaporized fuel processing apparatus according to claim 5, wherein, at the first stage, the closing valve control device is further configured to control the valve-opening amount of the closing valve in accordance with the internal pressure of the fuel tank detected by the internal pressure sensor such that the higher the internal pressure, the smaller the valve-opening amount.

7. The vaporized fuel processing apparatus according to claim 5, wherein, at the first stage, the closing valve control device is further configured to perform the opening-degree control of the closing valve such that a reduction gradient of the fuel tank internal pressure detected by the internal pressure sensor is not equal to a predetermined value or more.

8. The vaporized fuel processing apparatus according to claim 2, wherein the closing valve control device is further configured to switch between the first stage and the second stage when the internal pressure of the fuel tank detected by the internal pressure sensor has reached a predetermined switching pressure.

9. The vaporized fuel processing apparatus according to claim 8, wherein the closing valve control device is configured not to perform the opening degree control of the closing valve at the first stage and performs only the control at the second stage if the internal pressure of the fuel tank detected by the internal pressure sensor at the valve opening start time is lower than the switching pressure.

10. The vaporized fuel processing apparatus according to claim 1, wherein if the closing operation of the float valve is detected, the closing valve control device is further configured to reduce the opening degree of the closing valve by a predetermined amount.

11. The vaporized fuel processing apparatus according to claim 10, wherein the detection of the closing operation of the float valve is effected by detecting that the reduction amount of the fuel tank internal pressure is small in the state in which the closing valve is open.

12. The vaporized fuel processing apparatus according to claim 10, wherein the reduction of the opening degree of the closing valve is performed by a control of closing stepwise the closing valve by a predetermined amount, or by a control of continuously decreasing the opening degree of the closing valve until the float valve opens again.

13. The vaporized fuel processing apparatus according to claim 1, further comprising a lid door opening device configured to open a lid door, which closes a refueling port of the fuel tank, if the refueling start signal is output, while the internal pressure of the fuel tank detected by the internal pressure sensor is lower than the set pressure.

14. A vaporized fuel processing apparatus comprising:
a breather pipe configured to circulate vaporized fuel generated inside a fuel tank during refueling to a region of a refueling port of the fuel tank;
a canister configured to adsorb vaporized fuel generated inside the fuel tank such that the adsorbed vaporized fuel is drawn into an engine;
a closing valve configured to control communication between the fuel tank and the canister and provided in a path connecting the fuel tank and the canister; and
a closing valve control device configured to control an opening degree of the closing valve to a predetermined opening degree after starting the refueling, the predetermined opening degree being an opening degree which causes an internal pressure of the fuel tank to become higher than a first pressure that circulates a requisite amount of vaporized fuel to the region of the refueling port of the fuel tank via the breather pipe.

15. The vaporized fuel processing apparatus according to claim 14, wherein the predetermined opening degree is an opening degree that causes the internal pressure of the fuel tank to become lower than a second pressure, the second pressure corresponding to a pressure at which an auto stop function is exerted to stop the refueling by a refueling gun when the fuel tank is filled up.

16. The vaporized fuel processing apparatus according to claim 14, further comprising an internal pressure sensor for detecting a space pressure within the fuel tank as the internal pressure, wherein the closing valve control device is further configured to control, after starting the refueling, the opening degree of the closing valve based on the internal pressure of the fuel tank detected by the internal pressure sensor.

17. The vaporized fuel processing apparatus according to claim 16, wherein the closing valve control device is further configured to close the closing valve by a first predetermined amount when the internal pressure of the fuel tank detected by the internal pressure sensor becomes lower than a first set pressure that is previously set.

18. The vaporized fuel processing apparatus according to claim 16, wherein the closing valve control device is further configured to control the opening degree of the closing valve such that the internal pressure of the fuel tank detected by the internal pressure sensor becomes a second set pressure that is previously set.

19. The vaporized fuel processing apparatus according to claim 16, wherein the closing valve control device is further configured to perform the opening-degree control of the closing valve after having detected a peak of the internal pressure, which is increased by the vaporized fuel generated in the fuel tank when the refueling is started.

20. The vaporized fuel processing apparatus according to claim 16, wherein the closing valve control device is further configured to open the closing valve to a predetermined opening degree or by a second predetermined amount when the internal pressure of the fuel tank detected by the internal pressure sensor has reached to the second pressure.

* * * * *